US012594754B2

(12) United States Patent
Akaishi et al.

(10) Patent No.: US 12,594,754 B2
(45) Date of Patent: Apr. 7, 2026

(54) SHEET LAMINATOR AND IMAGE FORMING SYSTEM INCORPORATING THE SHEET LAMINATOR

(71) Applicants: Ryohsuke Akaishi, Kanagawa (JP); Yasunobu Kidoura, Kanagawa (JP); Hirofumi Horita, Kanagawa (JP); Satoshi Kuno, Tokyo (JP); Naohiro Yoshida, Kanagawa (JP)

(72) Inventors: Ryohsuke Akaishi, Kanagawa (JP); Yasunobu Kidoura, Kanagawa (JP); Hirofumi Horita, Kanagawa (JP); Satoshi Kuno, Tokyo (JP); Naohiro Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 147 days.

(21) Appl. No.: 18/645,664

(22) Filed: Apr. 25, 2024

(65) Prior Publication Data

US 2024/0359452 A1    Oct. 31, 2024

(30) Foreign Application Priority Data

Apr. 28, 2023    (JP) ................................. 2023-074365

(51) Int. Cl.
*B32B 41/02*        (2006.01)
*B32B 37/00*        (2006.01)
        (Continued)

(52) U.S. Cl.
CPC .......... *B32B 41/02* (2013.01); *B32B 37/0053* (2013.01); *B32B 37/1054* (2013.01);
        (Continued)

(58) Field of Classification Search
CPC .............. G03G 15/2039; G03G 15/205; B32B 37/0053; B32B 41/00; B32B 41/02; B32B 2037/0061
See application file for complete search history.

(56) References Cited

U.S. PATENT DOCUMENTS 3,754,819 A * 8/1973 Braun ................ G03G 15/2032
                                                                        432/60
2010/0284706 A1* 11/2010 Ito ...................... G03G 15/2039
                                                                        399/69
                (Continued)

FOREIGN PATENT DOCUMENTS

JP        2003-280419 A        10/2003
JP        2005-321511 A        11/2005
                (Continued)

OTHER PUBLICATIONS

English machine translation of JP2005321511 (Year: 2005).*

*Primary Examiner* — Scott W Dodds
(74) *Attorney, Agent, or Firm* — Harness, Dickey & Pierce, P.L.C.

(57)        ABSTRACT
A sheet laminator including a thermal pressure roller, a power cutoff device, a mover, a power line, and circuitry. The thermal pressure roller pair includes first and second rollers, and first and second heaters, to form a nip region to press and convey a two-ply sheet. The power cutoff device detects a change in temperature of at least one of the first or second roller, and cuts off a power to at least one of the first or second heater. The mover relatively moves the second roller away from the first roller. The power line couples the power cutoff device to the mover. The circuitry is to cause the power cutoff device to cut off the power line, and cause the mover to relatively move the second roller away from the first roller, in response to the power cutoff to at least one of the first or second heater.

9 Claims, 19 Drawing Sheets

(51) Int. Cl.

| | |
|---|---|
| *B32B 37/10* | (2006.01) |
| *B32B 37/18* | (2006.01) |
| *B32B 38/00* | (2006.01) |
| *G03G 15/20* | (2006.01) |
| *B32B 37/14* | (2006.01) |

(52) U.S. Cl.
CPC .......... *B32B 37/185* (2013.01); *B32B 38/145* (2013.01); *G03G 15/2039* (2013.01); *G03G 15/205* (2013.01); *B32B 2037/0061* (2013.01); *B32B 37/142* (2013.01); *B32B 2309/02* (2013.01)

(56) References Cited

U.S. PATENT DOCUMENTS

| | | | |
|---|---|---|---|
| 2018/0307169 A1* | 10/2018 | Takahashi .......... | G03G 15/2064 |
| 2021/0289090 A1 | 9/2021 | Monma et al. | |
| 2023/0244164 A1 | 8/2023 | Kidoura et al. | |
| 2023/0256726 A1 | 8/2023 | Kunieda et al. | |
| 2023/0264461 A1 | 8/2023 | Kuno et al. | |
| 2023/0264491 A1 | 8/2023 | Horita et al. | |
| 2023/0264909 A1 | 8/2023 | Kawakami et al. | |
| 2023/0303352 A1 | 9/2023 | Akaishi et al. | |

FOREIGN PATENT DOCUMENTS

| | | | |
|---|---|---|---|
| JP | 2010-262221 A | 11/2010 | |
| JP | 2018-180400 A | 11/2018 | |
| JP | 2021-143072 A | 9/2021 | |

* cited by examiner

| HEATER TURNED ON OR OFF | THERMAL PRESSURE ROLLER PAIR CONTACT OR SEPARATED | STATE OF DEVICE |
| --- | --- | --- |
| TURNED ON | CONTACT | NORMAL |
| TURNED ON | SEPARATED | POWER CUTOFF TROUBLE |
| TURNED OFF | CONTACT | MOVEMENT ASSEMBLY TROUBLE |
| TURNED OFF | SEPARATED | NORMAL |

SHEET LAMINATOR AND IMAGE FORMING SYSTEM INCORPORATING THE SHEET LAMINATOR

CROSS-REFERENCE TO RELATED APPLICATION

This patent application is based on and claims priority pursuant to 35 U.S.C. § 119(a) to Japanese Patent Application No. 2023-074365, filed on Apr. 28, 2023, in the Japan Patent Office, the entire disclosure of which is hereby incorporated by reference herein.

BACKGROUND

Technical Field

Embodiments of the present disclosure relate to a sheet laminator that performs sheet lamination on a two-ply sheet having two sheets between which an inner sheet is inserted, an image forming system incorporating the sheet laminator and an image forming apparatus.

Background Art

Various types of sheet laminators (i.e., sheet lamination devices) in the related art perform sheet lamination (sheet laminating operation) on an object to be processed (e.g., a two-ply sheet), the object including two sheets overlapped one another and an inner sheet between the two sheets.

Specifically, such a sheet laminator in the related art separates (peels) two sheets of a lamination sheet (e.g., a two-ply sheet) in which the two sheets are bonded at one ends of the lamination sheet, and inserts an inner paper (e.g., an inner sheet) on which an image is formed by the image forming apparatus, between the two sheets. Then, the lamination sheet in which the inner sheet is inserted is conveyed to a nip region of a thermal pressure roller pair (sheet lamination unit) in which a heater (heating unit) is disposed in each roller, so that the thermal pressure roller pair performs the sheet lamination on the lamination sheet by applying heat and pressure to the lamination sheet.

On the other hand, an image forming apparatus (printer) in the related art includes a fixing device in which, when a temperature of a fixing roller, a temperature of a pressure roller that forms a fixing nip by being pressed against the fixing roller, and a temperature of an external heating roller that supplementarily heats the fixing roller are out of target temperature ranges, respectively, the power to heaters provided in the fixing roller and the external heating roller is cut off, and the external heating roller is separated from the fixing roller.

SUMMARY

Embodiments of the present disclosure described herein provide a novel sheet laminator including a thermal pressure roller, a power cutoff device, a mover, a power line, and circuitry. The thermal pressure roller pair includes a first roller, a first heater to heat the first roller, a second roller, and a second heater to heat the second roller, to form a nip region between the first roller and the second roller to press and convey a two-ply sheet in which an inner sheet is inserted between two sheets of the two-ply sheet. The power cutoff device detects a change in temperature of at least one of the first roller or the second roller, and cuts off a power to at least one of the first heater or the second heater. The mover relatively moves the second roller away from the first roller. The power line couples the power cutoff device to the mover. The circuitry is to cause the power cutoff device to cut off the power line, and cause the mover to relatively move the second roller away from the first roller, in response to the power cutoff device cutting off the power to at least one of the first heater or the second heater.

Further, embodiments of the present disclosure described herein an image forming system including provide the above-described sheet laminator and an image forming apparatus to form an image on an inner sheet to be conveyed to the sheet laminator.

BRIEF DESCRIPTION OF THE SEVERAL VIEWS OF THE DRAWINGS

Exemplary embodiments of this disclosure will be described in detail based on the following figures, wherein.

Figure 1:
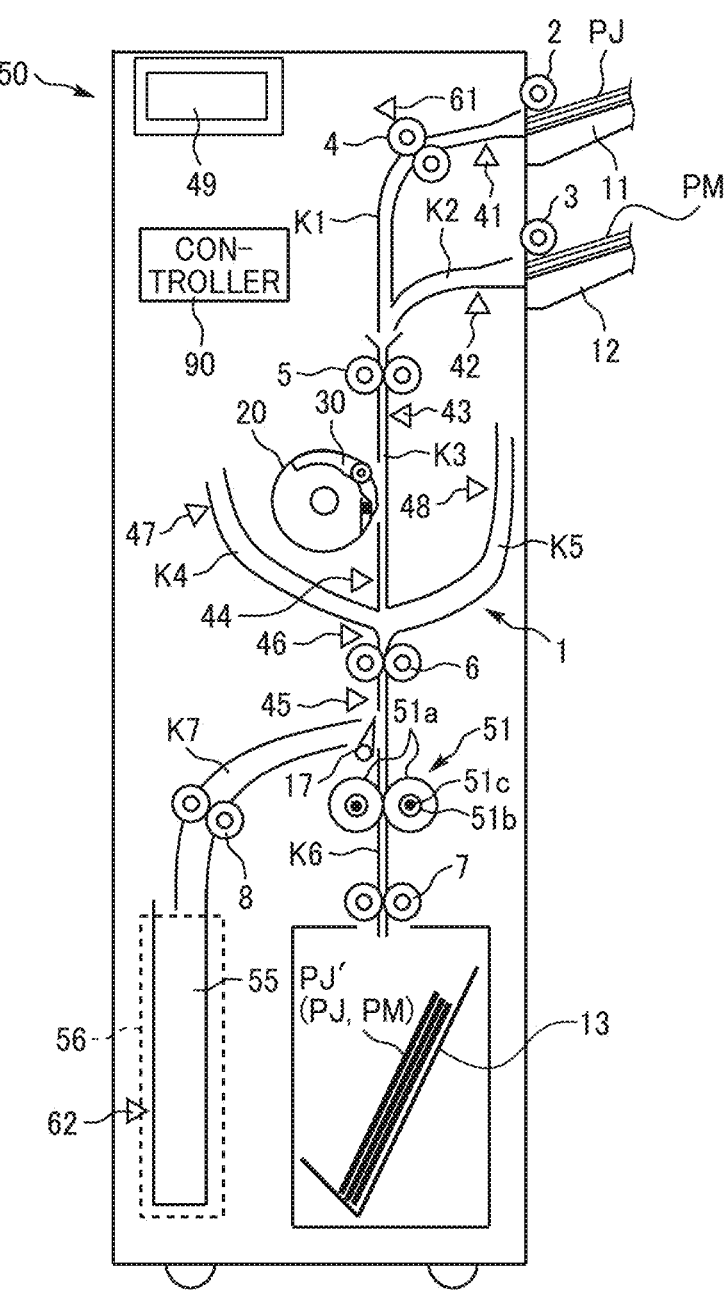
FIG. 1 is a schematic diagram illustrating an overall configuration of a sheet laminator according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Embodiments of the present disclosure are described below in detail with reference to the drawings. Identical reference numerals are assigned to identical or equivalent components and a description of those components may be simplified or omitted.

First, a description is given of the overall configuration and operations of a sheet laminator 50 as a sheet processing apparatus, with reference to FIG. 1.

FIG. 1 is a schematic diagram illustrating an overall configuration of a sheet laminator 50 according to an embodiment of the present disclosure.

The sheet laminator 50 includes: a sheet separation device 1 and a sheet lamination device 51 each as an example of a sheet processing device, a first sheet tray 11 and a second sheet tray 12 each as an example of a sheet feeder, an ejection tray 13 as an example of an ejection unit or a first ejection tray, and a purge tray 55 as an example of a purge unit or a second ejection tray. The sheet laminator 50 according to the present embodiment conveys a sheet (e.g., a two-ply sheet PJ and an inner sheet PM) downwardly.

The sheet laminator 50 includes an operation display panel 49 that functions as an operation display on the exterior of the sheet laminator 50 to display various kinds of information about the sheet laminator 50 and input various kinds of commands by a user.

The sheet lamination device 51 serving as a sheet processing device performs a sheet laminating operation on a two-ply sheet PJ by application of heat and pressure while conveying the two-ply sheet PJ in a predetermined sheet conveyance direction. The two-ply sheet PJ includes two sheets, which are a first sheet P1 and a second sheet P2, overlapped and bonded together at one end of the two-ply sheet PJ as a bonding portion A of the two-ply sheet PJ. An inner sheet PM is inserted between the first sheet P1 and the second sheet P2 of the two-ply sheet PJ.

The sheet separation device 1 as an example of a sheet processing device includes the first sheet tray 11, the second sheet tray 12, a first feed roller 2, a second feed roller 3, a multifeed detection sensor 61 as an example of a multifeed detector or sensor, a first conveyance roller pair 4, a second conveyance roller pair 5, a third conveyance roller pair 6, a first sensor 41, a second sensor 42, a third sensor 43, a fourth sensor 44, a fifth sensor 45, a sixth sensor 46, a seventh sensor 47, an eighth sensor 48, a winding roller 20, a movement mechanism 30, and separation members 16 (see FIGS. 7A to 7C and FIGS. 11A to 11E).

As illustrated in FIG. 1, the sheet laminator 50 includes the sheet separation device 1, the first sheet tray 11, the second sheet tray 12, the first feed roller 2, the second feed roller 3, the multifeed detection sensor 61 as an example of a multifeed detector or sensor, the first conveyance roller pair 4, the second conveyance roller pair 5, the third conveyance roller pair 6, the ejection tray 13, the first sensor 41, the second sensor 42, the third sensor 43, the fourth sensor 44, the fifth sensor 45, the sixth sensor 46, the seventh sensor 47, the eighth sensor 48, a purge sensor 62 as an example of a purge detector or sensor, a first guide 25 as an example of an inner restraint, and a second guide 26 as an example of an outer restraint. The sheet separation device 1 further includes the winding roller 20, the movement mechanism 30, switching members 17, and the separation members 16 (see FIGS. 6A, 6B, 6C, 6D, and 10). The sheet laminator 50 further includes a plurality of sheet conveyance passages as described below, such as a first sheet conveyance passage K1 (curved conveyance passage), a second sheet conveyance passage K2, a third sheet conveyance passage K3, a first branched sheet conveyance passage K4, and a second branched sheet conveyance passage K5.

The sheet separation device 1 is a sheet processing device that performs a sheet separating operation and a sheet inserting operation. To be more specific, the sheet separation device 1 serving as a sheet processing device performs the sheet separating operation to separate the non-bonding portion of a two-ply sheet PJ in which two sheets, which are a first sheet P1 and a second sheet P2, are overlapped and bonded together at one end of the two-ply sheet PJ as a bonding portion A of the two-ply sheet PJ (see FIGS. 11A to 11E and other drawings). The sheet separation device 1 then performs the sheet inserting operation to insert an inner sheet PM between the first sheet P1 and the second sheet P2 separated from each other by the sheet separating operation.

In particular, in the present embodiment, the two-ply sheet PJ includes the first sheet P1 and the second sheet P2 overlapped and bonded together at one sides of the four sides as the bonding portion A. In other words, in the two-ply sheet PJ including the first sheet P1 and the second sheet P2, one side (the bonding portion A) of the first sheet P1 and one side (the bonding portion A) of the second sheet P2 are bonded (attached) by, e.g., thermal welding or gluing, and the other side of the first sheet P1 and the other side of the second sheet P2 are not bonded (attached). As the first sheet P1 and the second sheet P2 of the two-ply sheet PJ, a transparent film sheet (that is, a lamination sheet) may be employed.

The sheet separation device 1 separates the first sheet P1 and the second sheet P2 of the two-ply sheet PJ, in other words, separates the other sides of the two sheets to the bonding portion A while maintaining bonding of the first sheet P1 and the second sheet P2 of the two-ply sheet PJ. Subsequently, the sheet separation device 1 inserts an inner sheet PM between the separated two sheets, which are the first sheet P1 and the second sheet P2 of the two-ply sheet PJ. The inner sheet PM is a sheet including at least one plain paper or a photograph.

The sheet lamination device 51 is a sheet processing device that performs the sheet laminating operation on the two-ply sheet PJ after the sheet separation device 1 has performed the sheet separating operation and the sheet inserting operation on the two-ply sheet PJ.

Specifically, the sheet lamination device 51 performs the sheet laminating operation on the two-ply sheet PJ after the inner sheet PM is inserted between the two sheets, which are the first sheet P1 and the second sheet P2 of the two-ply sheet PJ, while the two sheets are separated from each other by the sheet separation device 1. In other words, the sheet lamination device 51 applies heat and pressure on the non-bonding portion of the two sheets (i.e., the first sheet P1 and the second sheet P2) of the two-ply sheet PJ to bond the two sheets together when the inner sheet PM is inserted between the two sheets P1 and P2 of the two-ply sheet PJ. The sheet lamination device 51 is disposed downstream from the sheet separation device 1 in the sheet conveyance direction. In other words, the sheet lamination device 51 is disposed on the downstream side in the forward direction and the left side in FIG. 1. The sheet lamination device 51 includes a thermal pressure roller pair 51a that applies heat and pressure to the two-ply sheet PJ while conveying the two-ply sheet PJ in the forward direction with the inner sheet PM being inserted in the two-ply sheet PJ. Further, a fourth sheet conveyance passage K6 that functions as a sheet conveyance passage is provided between and defined by the third conveyance roller pair 6 and the sheet lamination device 51. The sheet lamination device 51 further includes the thermal pressure roller pair 51a, a rotary shaft 51b of the thermal pressure roller pair 51a, and a heater 51c as an example of a heater inside the rotary shaft 51b to heat the thermal pressure roller pair 51a. The heater 51c includes a first heater 51c1 and a second heater 51c2 as illustrated in FIGS. 14A, 14B, 15A, and 15B. The structures and operations of the thermal pressure roller pair 51a and the heater 51c are described in detail below, with reference to FIGS. 14A to 18.

The sheet lamination device 51 according to the present embodiment includes a single thermal pressure roller pair 51a, but the sheet lamination device 51 may include two or more thermal pressure roller pairs.

The ejection tray 13 stacks the two-ply sheet PJ' ejected from the sheet laminator 50. The two-ply sheet PJ' is the two-ply sheet PJ and the inner sheet PM after the sheet laminator 50 has performed the sheet laminating operation on the two-ply sheet PJ. In other words, the ejection tray 13 functions as an ejection unit to which the sheet is ejected after the sheet processing device (e.g., the sheet separation device 1 and the sheet lamination device 51) has performed the predetermined process (e.g., the sheet separating operation, the sheet inserting operation, and the sheet laminating operation) on the sheet.

The purge tray 55 functions as a purge unit stacks the sheet ejected when the sheet processing device (e.g., the sheet separation device 1 or the sheet lamination device 51) has not performed the predetermined process (e.g., the sheet separating operation, the sheet inserting operation, and the sheet laminating operation) on the sheet.

The sheet laminator 50 further includes the plurality of sheet conveyance passages such as the first sheet conveyance passage K1, the second sheet conveyance passage K2, the third sheet conveyance passage K3, the first branched sheet conveyance passage K4, the second branched sheet conveyance passage K5, the fourth sheet conveyance passage K6, and a non-laminated sheet conveyance passage K7. Each of the first sheet conveyance passage K1, the second sheet conveyance passage K2, the third sheet conveyance passage K3, the first branched sheet conveyance passage K4, the second branched sheet conveyance passage K5, the fourth sheet conveyance passage K6, and the retract sheet conveyance passage K7 includes two conveyance guides (guide plates) facing each other to guide and convey the sheet such as the two-ply sheet PJ and the inner sheet PM.

In particular, in the present embodiment, the first branched sheet conveyance passage K4 and the second branched sheet conveyance passage K5 branch off in different directions from the third sheet conveyance passage K3 between the winding roller 20 and the third sheet conveyance passage K3, with the third sheet conveyance passage K3 interposed between the first branched sheet conveyance passage K4 and the second branched sheet conveyance passage K5.

Further, the fourth sheet conveyance passage K6 is a sheet conveyance passage extending from the sheet separation device 1 (the third conveyance roller pair 6) to the sheet lamination device 51. Further, the non-laminated sheet conveyance passage K7 is a sheet conveyance passage extending from the sheet separation device 1 to the purge tray 55 serving as a purge unit. The non-laminated sheet conveyance passage K7 is different from the sheet conveyance passage to the sheet lamination device 51. Specifically, the fourth sheet conveyance passage K6 and the non-laminated sheet conveyance passage K7 branch off in different directions from the downstream side (i.e., the lower side in FIG. 1) of the third conveyance roller pair 6.

As illustrated in FIG. 1, the two-ply sheet PJ is stacked on the first sheet tray 11. The first feed roller 2 feeds the uppermost two-ply sheet PJ that is placed on top of the two-ply sheets PJ on the first sheet tray 11, to the first conveyance roller pair 4, and the first conveyance roller pair 4 conveys the (uppermost) two-ply sheet PJ along the first sheet conveyance passage K1.

As described above, each of the first sheet tray 11 and the first feed roller 2 function as a sheet feeder (first sheet feeder) to feed the two-ply sheet PJ toward the sheet conveyance passage. The sheet feeder is controlled by the controller 90 (see FIG. 1). To be more specific, the controller 90 drives and rotates the first feed roller 2 to feed the two-ply sheet PJ from the first sheet tray 11.

The sheet laminator 50 according to the present embodiment includes a multifeed detection sensor 61 (serving as a multifeed detector or sensor) near the first feed roller 2, in other words, at the position of the first conveyance roller pair 4. The multifeed detection sensor 61 can detect multiple feed of the two-ply sheets PJ, in other words, the state in which a plurality of two-ply sheets PJ are conveyed in layers at one time.

Further, inner sheets PM are stacked on the second sheet tray 12. Then, the second feed roller 3 feeds the uppermost inner sheet PM placed on top of the inner sheets PM on the second sheet tray 12.

As described above, the second sheet tray 12 and the second feed roller 3 function as a sheet feeder (second sheet feeder) to feed the inner sheet PM that is a sheet to be inserted between the two sheets, which are the first sheet P1 and the second sheet P2, of the two-ply sheet PJ with the non-bonding portion being separated.

Then, the controller 90 causes the second feed roller 3 to drive and rotate as a second sheet feeder, so as to feed the inner sheet PM from the second sheet tray 12 as a second sheet feeder.

Then, in the sheet laminator 50 according to the present embodiment, the controller 90 causes the second feed roller 3 (second sheet feeder) to start feeding the inner sheet PM from the second sheet tray 12 (second sheet feeder) after the first feed roller 2 (first sheet feeder) has fed the two-ply sheet PJ from the first sheet tray 11 (first sheet feeder) and before the operation to separate the non-bonding portion of the two-ply sheet PJ is completed.

In other words, in the present embodiment, the feeding of the two-ply sheet PJ and the feeding of the inner sheet PM are not performed separately (instructed by a user via the operation display panel 49) but can be performed in a single operation. To be more specific, as a user presses the button on the operation display panel 49 once to start the process, the sheet separating operation in which the two-ply sheet PJ is fed and separated, the sheet inserting operation in which the inner sheet PM is inserted into the two-ply sheet PJ between the first sheet P1 and the second sheet P2 separated from each other, and the sheet laminating operation are collectively performed automatically based on the single instruction (request).

The operation to start feeding the inner sheet PM from the second sheet tray 12 is performed not after completion of the sheet separating operation of the two-ply sheet PJ but performed before completion of the sheet separating operation of the two-ply sheet PJ. Due to such a configuration, the time for a series of steps from when the two-ply sheet PJ is fed from the first sheet tray 11 to when the inner sheet PM is completely inserted in the two-ply sheet PJ is reduced efficiently, and the productivity of the sheet separation device 1 is enhanced. In other words, the time for the operation from the start to the end performed by the sheet separation device 1 is reduced.

Each of the first conveyance roller pair 4, the second conveyance roller pair 5, the third conveyance roller pair 6, a first ejection roller pair 7, and a second ejection roller pair 8 includes a drive roller and a driven roller forming a nip region and conveys the sheet nipped by the nip region. The third sheet conveyance passage K3 includes the second conveyance roller pair 5, the winding roller 20, and the third conveyance roller pair 6, from the upstream side in the sheet conveyance direction. In particular, the winding roller 20, the third conveyance roller pair 6, and the second ejection roller pair 8 are rotatable in a forward direction or in a reverse direction. The third conveyance roller pair 6 and the second ejection roller pair 8 convey the sheet in the forward direction that is the left direction in FIG. 1 and in the reverse direction that is the right direction in FIG. 1. The third conveyance roller pair 6 also functions as a sheet conveyance roller pair that conveys the sheet toward the sheet lamination device 51 or to the purge tray 55.

The ejection roller pair 7 functions as a sheet conveyance roller pair that conveys and ejects the two-ply sheet PJ' (i.e., the two-ply sheet PJ and the inner sheet PM) after the sheet laminating operation, toward the ejection tray 13.

The switching member 17 is disposed downstream from the third conveyance roller pair 6 in the forward direction (i.e., the sheet conveyance direction to the lower side in FIG. 1). The switching member 17 that functions as a switcher or a switching plate switches the direction of conveyance of the sheet (e.g., the two-ply sheet PJ, the inner sheet PM), for example, between the direction conveying the sheet P toward the sheet lamination device 51 and the direction conveying the sheet P toward the purge tray 55. The switching member 17 is driven by a switching member motor 171 (see FIG. 2) as described below.

In other words, the switching member 17 functions as a switcher or a switching plate that switches a first state and a second state. The first state is a state in which the fourth sheet conveyance passage K6 is open and the non-laminated sheet conveyance passage K7 is closed, which is the state illustrated in FIG. 1, for example. The second state is a state in which the fourth sheet conveyance passage K6 is closed and the non-laminated sheet conveyance passage K7 is open.

The switching member 17 is controlled according to the mode selected by a user (in particular, when the sheet laminating operation is consecutively performed on the multiple two-ply sheets PJ), so as to appropriately switch the direction of conveyance of the sheet P (the destination of ejection of the sheet P).

Further, the sheet process to be performed in the regular operation is not performed on the two-ply sheet PJ when the two-ply sheets PJ are multifed or have separation failure. In such cases, the two-ply sheets PJ are not ejected to the ejection tray 13 but are ejected to the purge tray 55.

The purge tray 55 is provided with a purge sensor 62 as an example of a purge detector that detects the condition in which the sheet is stacked in the purge tray 55.

Referring to FIG. 1, each of the first sensor 41, the second sensor 42, the third sensor 43, the fourth sensor 44, the fifth sensor 45, the seventh sensor 47, the eighth sensor 48, and purge sensor 62 (purge detector) functions as a sheet detection sensor (sheet detector or sheet sensor) employing a reflection type photosensor that optically detects whether the sheet is present at the position of each sensor.

The first sensor 41 is disposed at the position near a portion downstream from the first conveyance roller pair 4 in the sheet conveyance direction. The second sensor 42 is disposed at the position near a portion downstream from the second feed roller 3 in the sheet conveyance direction. The third sensor 43 is disposed at the position near a portion downstream from the second conveyance roller pair 5 in the sheet conveyance direction. The fourth sensor 44 is disposed at the position near a portion downstream from the winding roller 20 (i.e., at the lower side of the winding roller 20 in FIG. 1) and upstream from the third conveyance roller pair 6 (i.e., at the upper side of the third conveyance roller pair 6 in FIG. 1) in the sheet conveyance direction. The fifth sensor 45 is disposed downstream from the fourth sheet conveyance passage K6 extending from the sheet separation device 1 to the sheet lamination device 51 (i.e., at the lower side of the third conveyance roller pair 6 in FIG. 1) in the sheet conveyance direction. Further, the seventh sensor 47 is disposed on the first branched sheet conveyance passage K4. The eighth sensor 48 is disposed on the second branched sheet conveyance passage K5. The purge tray 55 is provided with the purge sensor 62 to face the sheet stacked in the purge tray 55.

The sixth sensor 46 functions as an abnormal condition detector or sensor that detects an abnormal condition while the sheet separating operation is performed. The detailed description of the sixth sensor 46 is given below.

Figure 2:
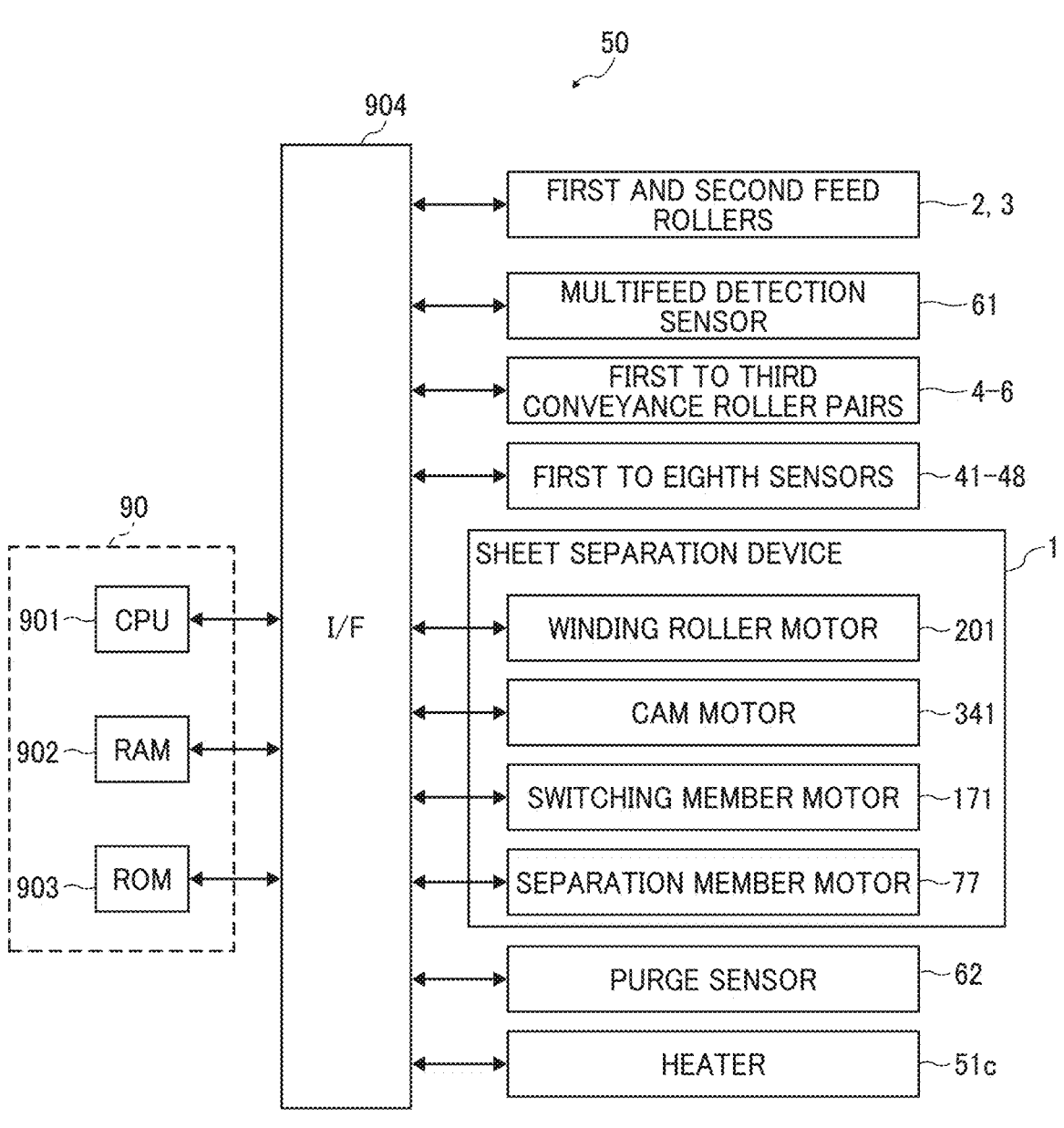
FIG. 2 is a block diagram illustrating a hardware configuration of the control block of the sheet laminator to control the operation of the sheet laminator.

A description is given of the control system of the sheet laminator 50, with reference to FIG. 2.

FIG. 2 is a block diagram illustrating a hardware configuration of the control block of the sheet laminator 50 to control the operation of the sheet laminator 50.

As illustrated in FIG. 2, the sheet laminator 50 has the control system including a central processing unit (CPU) 901, and a random access memory (RAM) 902, a read-only memory (ROM) 903, and an interface (I/F) 904. The CPU 901, the RAM 902, are the ROM 903 are connected via the I/F 904.

The CPU 901 is an arithmetic unit and controls the overall operation of the sheet laminator 50. The RAM 902 is a volatile storage medium that allows data to be read and written at high speed. The CPU 901 uses the RAM 902 as a work area for data processing. The ROM 903 is a read-only non-volatile storage medium that stores programs such as firmware.

The sheet laminator 50 processes, by an arithmetic function of the CPU 901, e.g., a control program stored in the ROM 903 and an information processing program (or application program) loaded into the RAM 902. Such processing configures a software controller including various functional modules of the sheet laminator 50. The software controller thus configured cooperates with hardware resources of the sheet laminator 50 to construct functional blocks to implement functions of the sheet laminator 50.

In other words, the CPU 901, the RAM 902, and the ROM 903 constitute the controller 90 to control the operation of the sheet laminator 50.

The I/F 904 is an interface that connects the first feed roller 2, the second feed roller 3, the multifeed detection sensor 61, the first conveyance roller pair 4, the second conveyance roller pair 5, the third conveyance roller pair 6, the first sensor 41, the second sensor 42, the third sensor 43, the fourth sensor 44, the fifth sensor 45, the sixth sensor 46, the seventh sensor 47, the eighth sensor 48, a winding roller motor 201, a cam motor 341, a switching member motor 171, a separation member motor 77, the purge sensor 62, and the heater 51c, to the controller 90. The controller 90 controls respective operations of the first feed roller 2, the second feed roller 3, the first conveyance roller pair 4, the second conveyance roller pair 5, the third conveyance roller pair 6, the winding roller motor 201, the cam motor 341, the switching member motor 171, the separation member motor 77, and the heater 51c, via the I/F 904. The controller 90 acquires respective detection results from the first sensor 41, the second sensor 42, the third sensor 43, the fourth sensor 44, the fifth sensor 45, the sixth sensor 46, the seventh sensor 47, the eighth sensor 48, and the purge sensor 62.

The winding roller motor 201 is a drive unit to drive the winding roller 20. The cam motor 341 is a drive unit to drive the cam 34. The switching member motor 171 is a drive unit to drive the switching members 17.

A description is given of the winding roller 20, with reference to FIGS. 3A, 3B, 4A, 4B, 6B, 6B', 6C, 6C', 6D, and 7A.

Figure 3A:
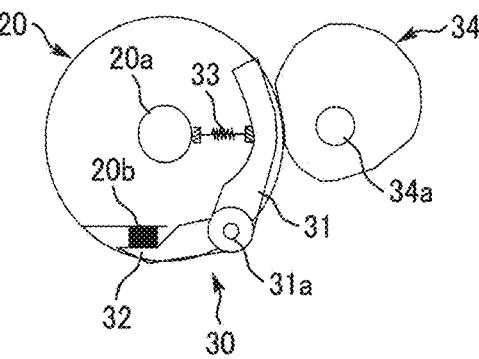
FIG. 3A is a side view of a gripper that has moved to a gripping position in a sheet separation device included in the sheet laminator illustrated in FIG. 1.

FIG. 3A is a side view of a gripper that has moved to a gripping position in a sheet separation device included in the sheet laminator illustrated in FIG. 1.

Figure 3B:
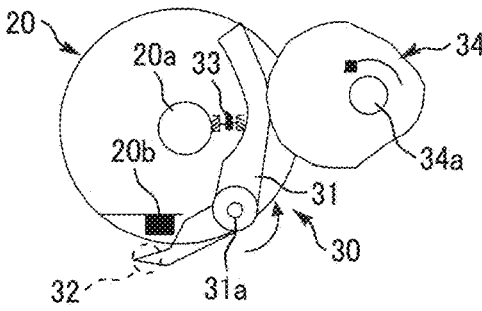
FIG. 3B is a side view of the gripper that has moved to a releasing position in the sheet separation device included in the sheet laminator illustrated in FIG. 1.

FIG. 3B is a side view of the gripper that has moved to a releasing position in the sheet separation device included in the sheet laminator illustrated in FIG. 1.

Figure 4A:
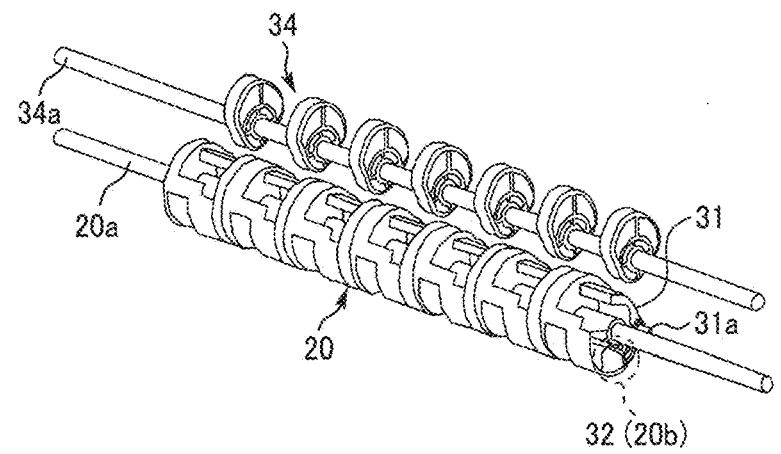
FIG. 4A is a perspective view of the gripper that has moved to the gripping position in the sheet separation device included in the sheet laminator illustrated in FIG. 1.

FIG. 4A is a perspective view of the gripper that has moved to the gripping position in the sheet separation device included in the sheet laminator illustrated in FIG. 1.

Figure 4B:
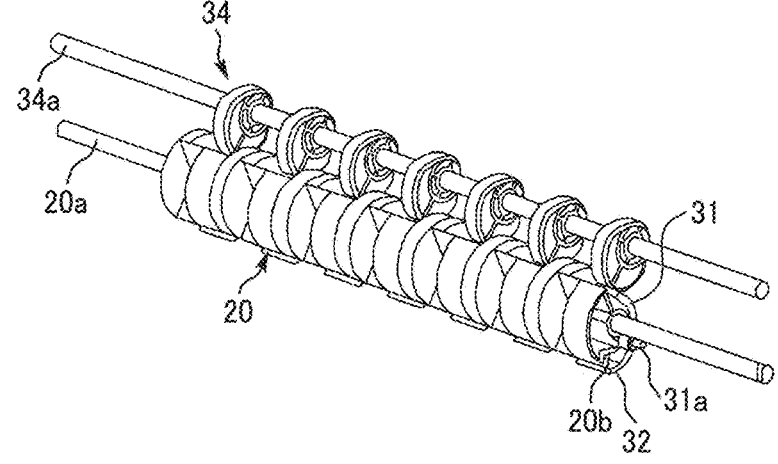
FIG. 4B is a perspective view of the gripper that has moved to the releasing position in the sheet separation device included in the sheet laminator illustrated in FIG. 1.

FIG. 4B is a perspective view of the gripper that has moved to the releasing position in the sheet separation device included in the sheet laminator illustrated in FIG. 1.

FIGS. 5A, 5B, 5C, and 5D are schematic views of the sheet laminator, each illustrating the sheet separating operation performed in the sheet laminator.

Figure 5A:
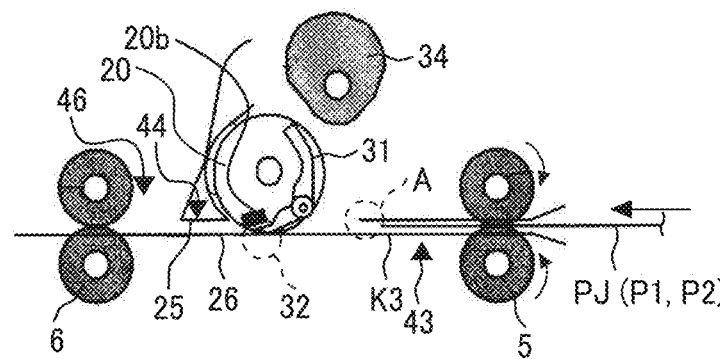
FIGS. 5A, 5B, 5C, and 5D are schematic views of the sheet laminator, each illustrating the sheet separating operation performed in the sheet laminator.
Figure 5B:
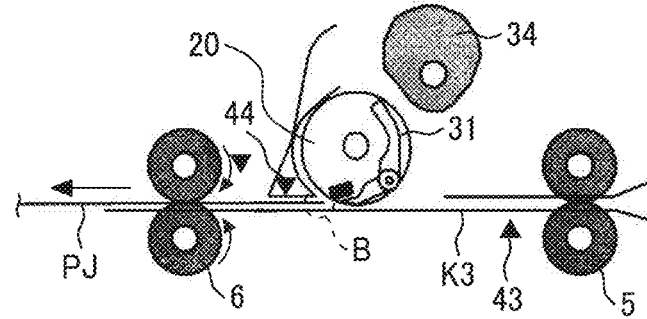
Figure 5C:
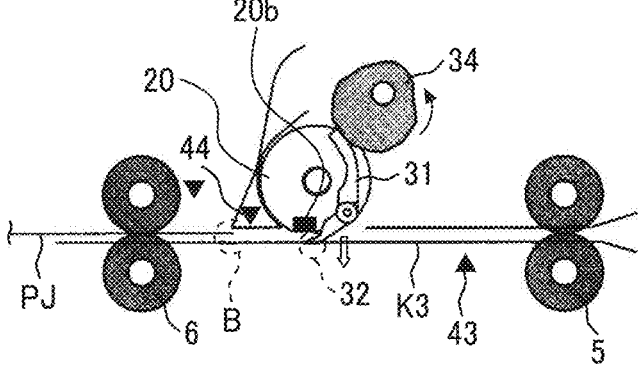
Figure 5D:
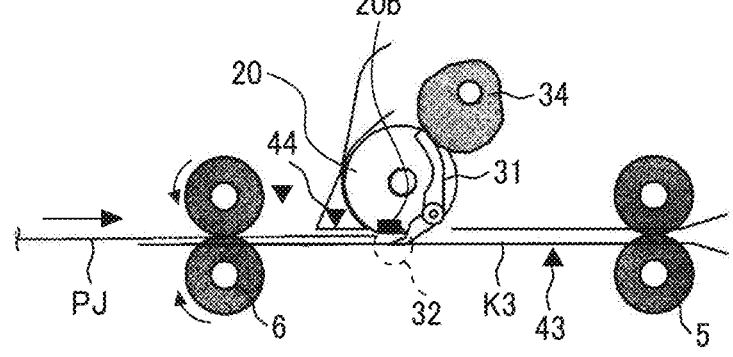
Figure 6A:
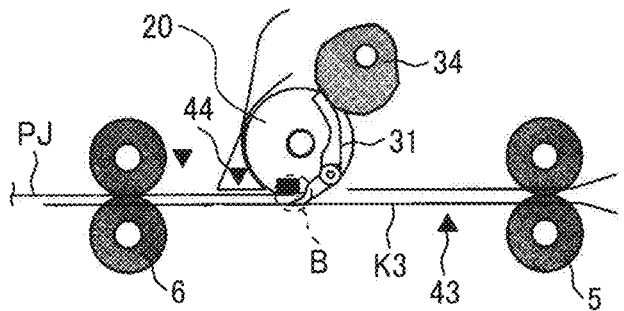
FIGS. 6A, 6B, 6B', 6C, 6C', and 6D are schematic views of the sheet laminator, each illustrating the sheet separating operation performed in the sheet laminator, subsequent from the sheet separating operation of each of FIGS. 5A, 5B, 5C, and 5D.
Figure 6B:
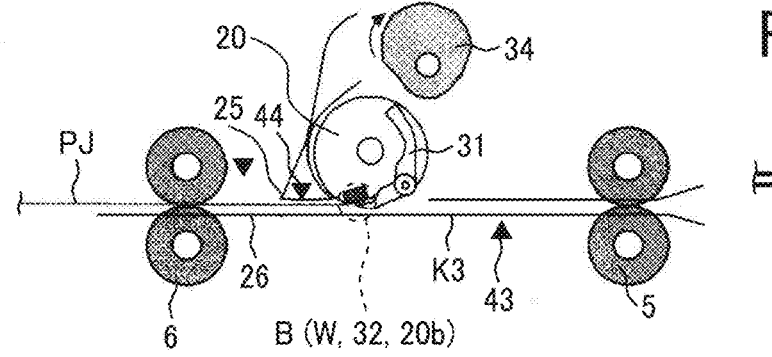
Figure 6B:
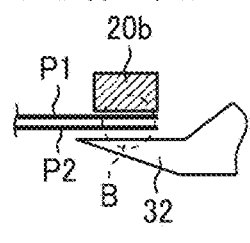

FIGS. 6A, 6B, 6B', 6C, 6C', and 6D are schematic views of the sheet laminator, each illustrating the sheet separating operation performed in the sheet laminator, subsequent from the sheet separating operation of each of FIGS. 5A, 5B, 5C, and 5D.

Figure 7A:
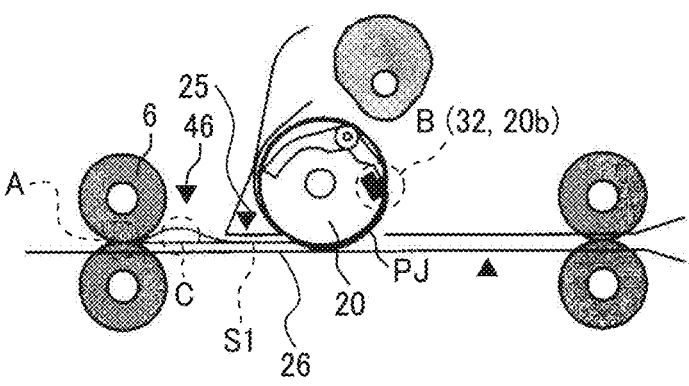
FIGS. 7A, 7B, and 7C are schematic views of the sheet laminator, each illustrating the sheet separating operation performed in the sheet laminator, subsequent from the sheet separating operation of each of FIGS. 6A, 6B, 6B', 6C, 6C', and 6D.
Figure 7B:
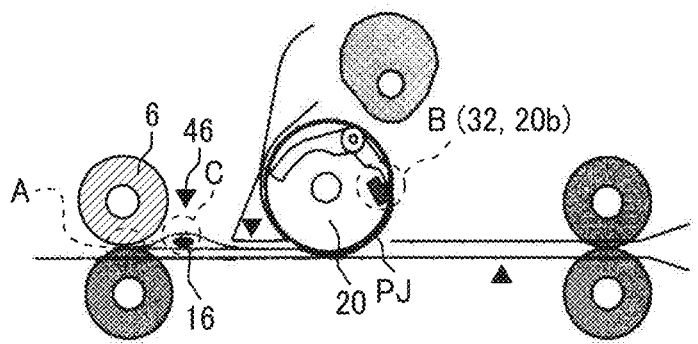
Figure 7C:
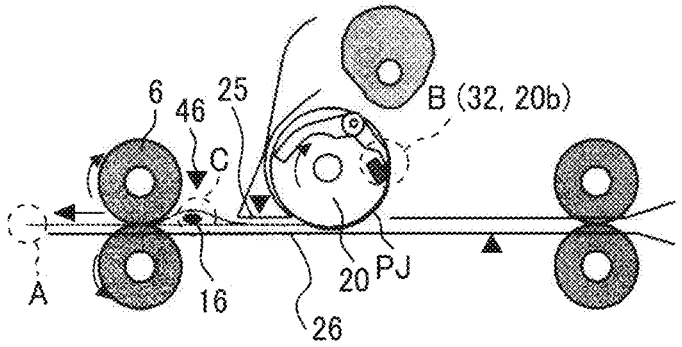

FIGS. 7A, 7B, and 7C are schematic views of the sheet laminator, each illustrating the sheet separating operation performed in the sheet laminator, subsequent from the sheet separating operation of each of FIGS. 6A, 6B, 6B', 6C, 6C', and 6D.

The winding roller 20 is a roller that winds the two-ply sheet PJ, with a gripper 32 as an example of a handle grips a gripped portion B of the two-ply sheet PJ at a winding start position W (see FIG. 6B). The gripped portion B is an end of the two-ply sheet PJ that is the other end at which the bonding portion A is formed, which is referred to as the other end of the two-ply sheet PJ. While the gripper 32 grips the gripped portion B of the two-ply sheet PJ, the winding roller 20 rotates in a predetermined rotational direction (i.e., the counterclockwise direction in FIG. 6B) to wind the two-ply sheet PJ around the winding roller 20. The winding roller 20 is rotatable around a rotary shaft 20a in the forward direction and in the reverse direction. The controller 90 controls the winding roller motor 201 that drives the winding roller 20.

To be more specific, the two-ply sheet PJ is fed from the first sheet tray 11, passes through the first sheet conveyance passage K1, and is conveyed by the second conveyance roller pair 5 in the forward direction along the third sheet conveyance passage K3. The two-ply sheet PJ then passes through the winding start position W of the winding roller 20 temporarily and is conveyed to the position of the third conveyance roller pair 6 that is a position at which the trailing end of the two-ply sheet PJ passes the fourth sensor 44 but does not pass through the third conveyance roller pair 6, that is, the position before the third conveyance roller pair 6. Then, the third conveyance roller pair 6 rotates in the reverse direction to convey the two-ply sheet PJ in the reverse direction to the position of the winding roller 20 that is the winding start position W, and the gripper 32 grips the other end (leading end) of the two-ply sheet PJ. The two-ply sheet PJ is further conveyed with the other end (leading end) of the two-ply sheet PJ being gripped by the gripper 32, and the winding roller 20 rotates in the counterclockwise direction in FIG. 1 to wind the two-ply sheet PJ around the winding roller 20.

While FIG. 1 depicts the sheet laminator 50 conveying the sheet (e.g., the two-ply sheet PJ and the inner sheet PM) in the vertical direction, FIGS. 3A to 11E depict the sheet laminator 50 conveying the sheet in the horizontal direction.

Figure 8A:
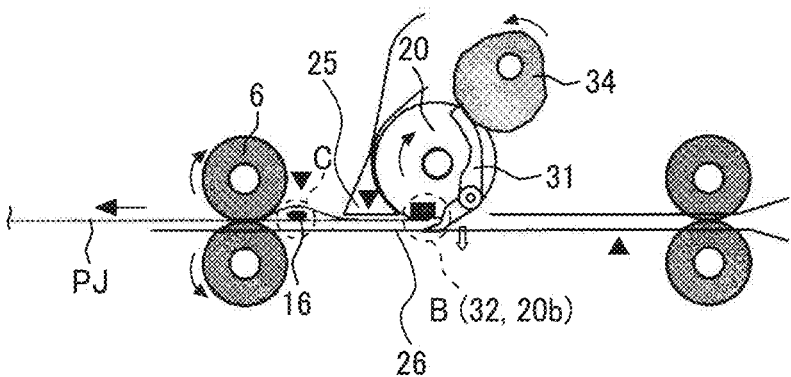
FIGS. 8A, 8B, and 8C are schematic views of the sheet laminator, each illustrating the sheet separating operation performed in the sheet laminator, subsequent from the sheet separating operation of FIGS. 7A, 7B, and 7C.
Figure 8B:
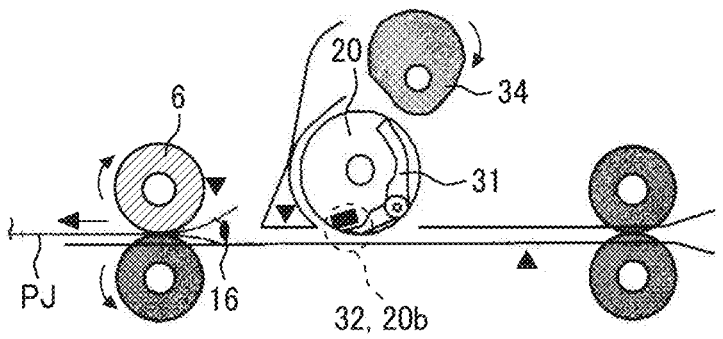
Figure 8C:
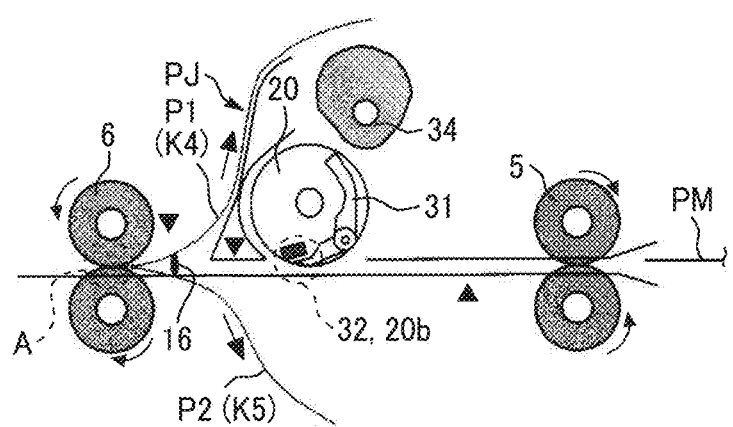

FIGS. 8A, 8B, and 8C are schematic views of the sheet separation device, each illustrating the sheet separating operation performed in the sheet separation device, subsequent from the sheet separating operation of FIGS. 7A, 7B, and 7C.

Figure 9A:
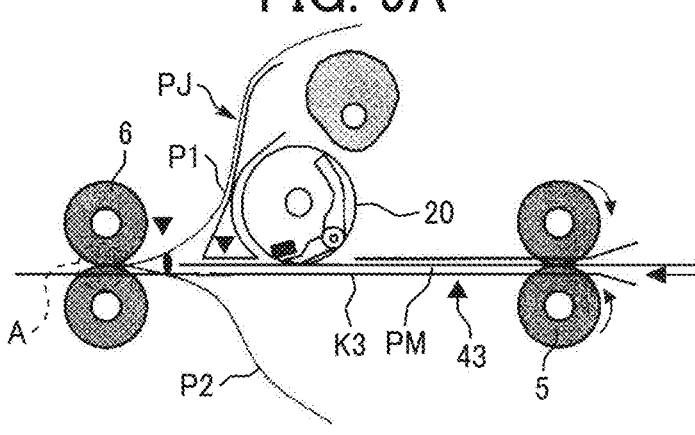
FIGS. 9A, 9B, and 9C are schematic views of the sheet laminator, each illustrating the sheet separating operation performed in the sheet laminator, subsequent from the sheet separating operation of FIGS. 8A, 8B, and 8C.
Figure 9B:
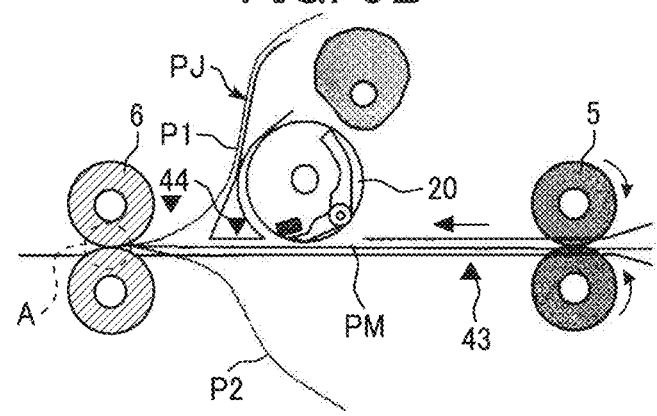
Figure 9C:
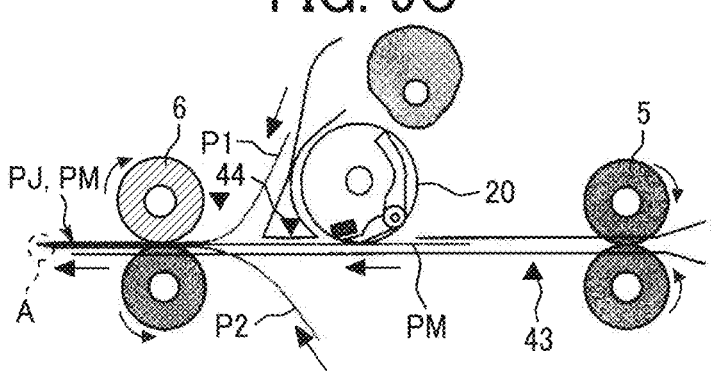

FIGS. 9A, 9B, and 9C are schematic views of the sheet separation device, each illustrating the sheet separating operation performed in the sheet separation device, subsequent from the sheet separating operation of FIGS. 8A, 8B, and 8C.

Figure 10:
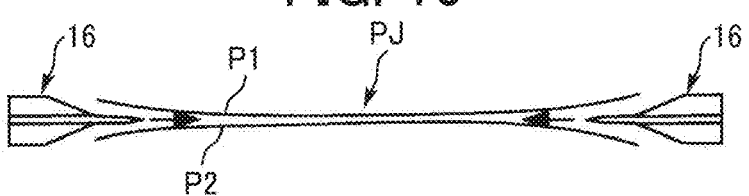
FIG. 10 is a schematic view of separation members inserted into a two-ply sheet in a width direction of the two-ply sheet.

FIG. 10 is a schematic view of separation members inserted into the two-ply sheet in the width direction of the two-ply sheet.

FIGS. 11A, 11B, 11C, 11D, and 11E are perspective views, each illustrating the operation of the separation members.

Figure 6C:
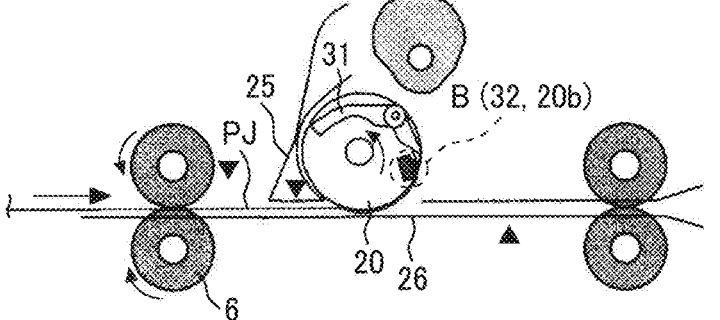
Figure 6C:
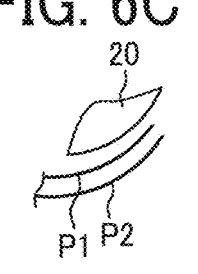
Figure 6D:
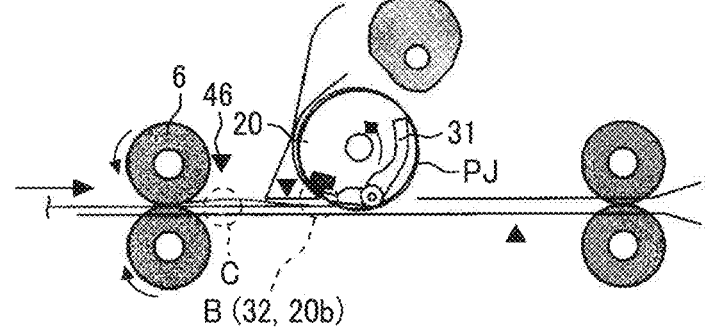

With reference to FIG. 6C', when the two-ply sheet PJ is wound around the winding roller 20, the length of the two-ply sheet PJ wound around the winding roller 20 is proportional to the diameter of the winding roller 20. Since the first sheet P1 is on the inner side to the center of the winding roller 20, in other words, is closer to the inner circumferential surface of the winding roller 20, and a second sheet P2 on the outer side to the center of the winding roller 20, in other words, is closer to the outer circumferential surface of the winding roller 20, the length of the first sheet P1 wound around the winding roller 20 is shorter than the length of the second sheet P2 wound around the winding roller 20. As a result, displacement occurs in the part of the two-ply sheet PJ in which the sheet P1 is in close contact with the sheet P2 (in other words, the part in which the sheet P1 sticks to the sheet P2) other than the bonding portion A and the gripped portion B. The displacement causes the first sheet P1 to slack and bend toward the second sheet P2, forming a gap C between the two sheets, which are the first sheet P1 and the second sheet P2, near the bonding portion A of the two-ply sheet PJ, as illustrated in FIGS. 6D and 7A. In other words, when the first sheet P1 that is placed on the second sheet P2 is warped upward, the gap C is formed between the first sheet P1 and the second sheet P2 at one end of the two-ply sheet PJ.

As described above, the first sheet P1 and the second sheet P2 that are in close contact with each other without any gap are separated (peeled) from each other.

Particularly in the present embodiment, in order to significantly form the gap C as described above, in other words, in order to increase the difference between the length of the first sheet P1 wound around the winding roller 20 and the length of the second sheet P2 wound around the winding roller 20, the two-ply sheet PJ is wound around the winding roller 20 at least one round.

As described above, in the present embodiment, by providing the winding roller 20 around which the two-ply sheet PJ is wound, the two-ply sheet PJ is separatable without significantly increasing the size and cost of the sheet laminator 50.

As illustrated in FIG. 6B', the gripper 32 in the present embodiment grips the gripped portion B of the two-ply sheet PJ without contacting the end face of the other end (the gripped portion B) of the two-ply sheet PJ.

More specifically, the gripper 32 nips and grips the gripped portion B of the two-ply sheet PJ between the gripper 32 and a receiving portion 20b of the winding roller 20 without causing any member to contact the end face of the other end of the two-ply sheet PJ, in other words, without causing any member to hit or contact the end face of the two-ply sheet PJ. The receiving portion 20b of the winding roller 20 is a part of the outer circumferential portion of the winding roller 20 and is arranged to be exposed outwardly and facing the gripper 32.

To be more specific, the two-ply sheet PJ is not nipped and gripped by the gripper 32 and the receiving portion 20b of the winding roller 20 when a specific member such as the gripper 32 contacts the end face of the other end (i.e., the leading end face). The two-ply sheet PJ is nipped and gripped by the gripper 32 and the receiving portion 20b while the end face of the other end (i.e., the leading end face) does not contact any member. At this time, the gripper 32 is located close to the second sheet P2 on the outer side to the center of the winding roller 20 and the receiving portion 20b is located close to the first sheet P1 on the inner side to the center of the winding roller 20.

Accordingly, when compared with a configuration in which the leading end face of the two-ply sheet PJ contacts a member, the above-described structure according to the present embodiment can reduce damage on the two-ply sheet PJ (particularly, the leading end). In particular, once the leading end face of the two-ply sheet PJ is damaged, it is difficult to perform the sheet laminating operation on the damaged leading end face. For this reason, the configuration of an embodiment of the present disclosure is useful.

In the present embodiment, the bonding portion A of the two-ply sheet PJ wound around the winding roller 20 is the one end of the two-ply sheet PJ. The one end is opposite to the other end functioning as the gripped portion B.

In the present embodiment, at least the gripper 32 (handle) or the receiving portion 20b is made of elastic material such as rubber.

Compared with a sheet separation device including the gripper 32 and the receiving portion 20b that are rigid bodies made of metal or resin, the above-described sheet separation device can increase a gripping force to grip the two-ply sheet PJ and prevent surfaces of the two-ply sheet PJ from being damaged. In particular, when the gripper 32 and the receiving portion 20b are made of the elastic material, this configuration can easily achieve the above-described effect.

As illustrated in FIGS. 3A, 3B, 4A, and 4B, the movement mechanism 30 moves the gripper 32 between a gripping position (e.g., the position illustrated in FIGS. 3A and 4A) at which the gripper 32 can grip the two-ply sheet PJ and a releasing position (e.g., the position illustrated in FIGS. 3B and 4B) at which the gripper 32 is released from the gripping position.

More specifically, the movement mechanism 30 includes an arm 31, a compression spring 33, a cam 34, and the cam motor 341 (see FIG. 2). The compression spring 33 functions as a biasing member. The cam motor 341 drives to rotate the cam 34 in the forward direction or the reverse direction.

The arm 31 holds the gripper 32. The arm 31 and the gripper 32 are held together by the winding roller 20 to be rotatable together around a support shaft 31a. In the present embodiment, the gripper 32 is coupled to the tip of the arm 31, and the gripper 32 and the arm 31 are made (held) as a single unit. Alternatively, the gripper 32 and the arm 31 may be made as separate members, and the gripper 32 may be disposed on the arm 31, that is, may be held by the arm 31. In any case, the arm 31 holding the gripper 32 rotates around the rotary shaft 20a together with the winding roller 20.

The compression spring 33 functions as a biasing member that biases the arm 31 so that the gripper 32 moves from the releasing position illustrated in FIG. 3B to the gripping position illustrated in FIG. 3A. To be more specific, one end of the compression spring 33 is coupled to a fixed position near the rotary shaft 20a, and the other end of the compression spring 33 is coupled to one end of the arm 31 that is an end opposite to the other end of the arm 31 coupled to the gripper 32 with respect to the support shaft 31a.

The cam 34 pushes the arm 31 against the biasing force of the compression spring 33 that functions as the biasing member, so that the gripper 32 moves from the gripping position illustrated in FIG. 3A to the releasing position illustrated in FIG. 3B. The cam motor 341 that is controlled by the controller 90 drives the cam 34 to rotate in the forward direction or the reverse direction at a desired rotation angle. The cam 34 is held by the housing of the sheet laminator 50 so as to be rotatable around a cam shaft 34a separately from the winding roller 20.

In the movement mechanism 30 having the above-described configuration, as illustrated in FIGS. 3A and 4A, when the cam 34 is not in contact with the arm 31, the arm 31 is biased by the compression spring 33 to press the gripper 32 against the receiving portion 20b. This state is referred to as a closed state. In the closed state, the gripper 32 and the receiving portion 20b grip the two-ply sheet PJ.

By contrast, as illustrated in FIGS. 3B and 4B, while the cam 34 is contacts and presses the arm 31, the arm 31 rotates in the counterclockwise direction in FIG. 3B about the support shaft 31a against the biasing force of the compression spring 33, so that the gripper 32 separates from the receiving portion 20b. This state is referred to as an open state. In the open state, the two-ply sheet PJ is not gripped, which is referred to as a grip release state.

In the present embodiment, as illustrated in FIGS. 4A and 4B, the winding roller 20 includes a plurality of roller portions (i.e., seven roller portions in the present embodiment) separated in the axial direction of the winding roller 20. Similarly, the cam 34 includes a plurality of cam portions separated in the axial direction of the cam 34 so that the divided positions of the plurality of cam portions of the cam 34 respectively meet and face the plurality of roller portions of the winding roller 20.

Setting portions provided at given intervals in the axial direction to grip the two-ply sheet PJ as described above, that is, not setting the entire area of the winding roller 20 and the cam 34 in the axial direction to grip the two-ply sheet PJ share load for gripping the two-ply sheet PJ. The above-described configuration is useful when a gripping force for gripping the two-play sheet PJ increases.

A description is given of the fourth sensor 44 in the sheet laminator 50 according to the present embodiment, with reference to FIGS. 1, 5D, and 6A.

The fourth sensor 44 functions as a sheet detection sensor to detect the two-ply sheet PJ conveyed between the winding roller 20 and the third conveyance roller pair 6. The fourth sensor 44 detects the leading end of the two-ply sheet PJ conveyed by the third conveyance roller pair 6 toward the winding roller 20 in the sheet conveyance direction. Based on the detection results detected by the fourth sensor 44, the controller 90 controls the movement mechanism 30.

More specifically, the fourth sensor 44 is disposed in the sheet conveyance passage between the winding roller 20 and the third conveyance roller pair 6. As illustrated in FIGS. 5D and 6A, when the third conveyance roller pair 6 conveys the two-ply sheet PJ in the reverse direction toward the position of the winding roller 20 in the reverse direction, with the gripped portion B of the two-ply sheet PJ being the leading end, the fourth sensor 44 detects the leading end (i.e., the end of the gripped portion B) of the two-ply sheet PJ. In response to the detection timing at which the fourth sensor 44 detects the leading end (in the reverse direction) of the gripped portion B, the controller 90 adjusts and controls the timing to stop the two-ply sheet PJ at the gripping position and the timing at which the gripper 32 grips the gripped portion B. To be more specific, after the predetermined time has passed since the fourth sensor 44 detected the leading end of the two-ply sheet PJ, the third conveyance roller pair 6 stops conveyance of the two-ply sheet PJ in the reverse direction, and the cam 34 rotates to pivot the arm 31 of the movement mechanism 30 so that the gripper 32 moves from the releasing position illustrated in FIG. 3B to the gripping position illustrated in FIG. 3A.

The above-described control accurately performs an operation in which the end face of the two-ply sheet PJ is nipped by the gripper 32 and the receiving portion 20b without contacting the end face of the two-ply sheet PJ on any member.

As described above, the third conveyance roller pair 6 is a sheet conveyance roller pair that conveys the two-ply sheet PJ with the other end (i.e., the gripped portion B) as a leading end, toward the winding start position W of the winding roller 20 in the third sheet conveyance passage K3 (sheet conveyance passage) between the third conveyance roller pair 6 and the winding roller 20.

A description is given of the separation members 16 each functioning as a separator, with reference to FIGS. 7A, 7B, 7C, 10, 11A, 11B, 11C, 11D, 11E, and 13.

Figure 11A:
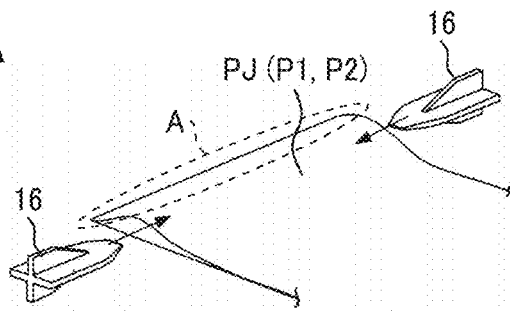
FIGS. 11A, 11B, 11C, 11D, and 11E are perspective views, each illustrating the operation of the separation members.

Each of the separation members 16 is a plate that moves from the standby position illustrated in FIG. 11A to be inserted into the gap C formed in the non-bonding portion (the gripped portion) between the first sheet P1 and the second sheet P2 of the two-ply sheet PJ at a predetermined position of the two-ply sheet PJ.

To be more specific, the separation members 16 are inserted into the gap C formed between the first sheet P1 and the second sheet P2 at a position between the winding roller 20 and the third conveyance roller pair 6 from the standby positions outside both ends of the two-ply sheet PJ in the width direction of the two-ply sheet PJ, with respect to the two-ply sheet PJ when the other end (i.e., the gripped portion B) is wound by the winding roller 20 and the one end (i.e., the bonding portion A) is nipped by the third conveyance roller pair 6.

Figure 13:
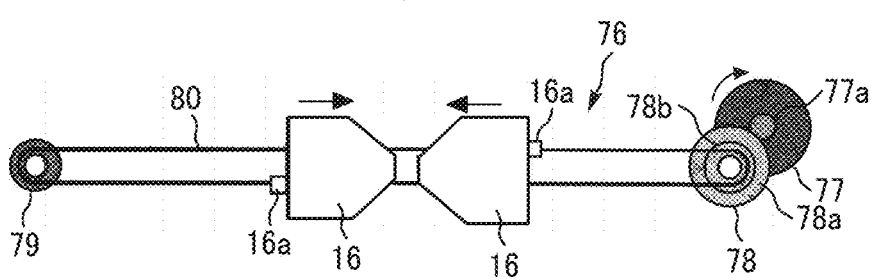
FIG. 13 is a diagram illustrating the configuration of a movement mechanism to move the separation members.

More specifically, in the present embodiment, the separation members 16 are a pair of separation members each functioning as a pair of separators or separation plates disposed at both sides of the third conveyance passage K3 in the width direction (i.e., the direction perpendicular to a plane on which FIGS. 7A to 7C are illustrated and the horizontal direction in FIGS. 10 and 13). As illustrated in FIGS. 11A to 11E, the length of each of the separation members 16 in the vertical direction (i.e., the thickness direction of the two-ply sheet PJ) gradually increases from the tip of each of the separation members 16 near the center in the width direction of the two-ply sheet PJ, to the rear end of each of the separation members 16 near the outsides in the width direction of the two-ply sheet PJ. Further, the separation members 16 are movable in the width direction of the two-ply sheet PJ by a driving device 76 (see FIG. 13) controlled by the controller 90.

Figure 11B:
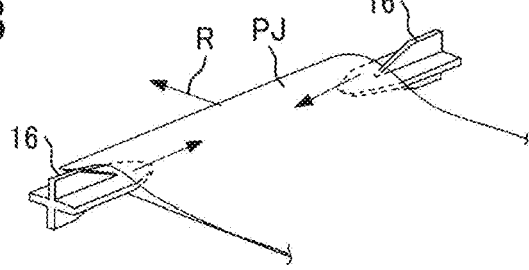

The separation members 16 having the above-described structure ordinarily stand by at respective standby positions at which the separation members 16 do not interfere with conveyance of the sheet such as the two-ply sheet PJ in the third sheet conveyance passage K3. As illustrated in FIG. 11A, the standby positions of the separation members 16 are outside of the two-ply sheet PJ (including the first sheet P1 and the second sheet P2) in the width direction of the two-ply sheet PJ. Subsequently, as illustrated in FIGS. 10 and 11B, the separation members 16 enter the gap C in the two-ply sheet PJ when separating the two-ply sheet PJ (including the first sheet P1 and the second sheet P2). As a result, the separation members 16 secure the gap C to be relatively large.

As illustrated in FIG. 13, the driving device 76 that moves the separation members 16 as a pair of separation members in the width direction includes a separation member motor 77, a gear pulley 78, a pulley 79, and a timing belt 80. The gear pulley 78 includes a gear portion 78a and a pulley portion 78b in steps. The gear portion 78a meshes with a motor gear 77a mounted on the motor shaft of the separation member motor 77. The pulley portion 78b stretches and supports the timing belt 80 with the pulley 79. One of the separation members 16 serving as a pair of separation members includes a fixed portion 16a that is fixed to a part of the belt surface of the timing belt 80 that is the upper side of the belt surface in FIG. 13. The other one of the separation members 16 serving as a pair of separation members includes another fixed portion 16a that is fixed to a part of the other belt surface of the timing belt 80 that is the lower side of the belt surface in FIG. 13.

In the driving device 76 having the above-described configuration, the separation member motor 77 drives to rotate the motor shaft in a direction indicated by arrow in FIG. 13 (i.e., in the clockwise direction), the gear pulley 78 rotates in the counterclockwise direction, the timing belt 80 rotates in the counterclockwise direction, and the separation members 16 serving as a pair of separation members or plates moves from the outside in the width direction of the two-ply sheet PJ toward the center in the width direction of the two-ply sheet PJ (in other words, the separation members 16 approaches each other). On the other hand, when the separation member motor 77 drives to rotate the motor shaft in the direction opposite to the direction indicated by arrow in FIG. 13, the separation members 16 as an example of a pair of separation members moves away from the center in the width direction of the two-ply sheet PJ toward the outside in the width direction of the two-ply sheet PJ (in other words, the separation members 16 moves in a direction away from each other).

With the separation members 16 being inserted into the gap C in the two-ply sheet PJ, the separation members 16 relatively move from the one end of the two-ply sheet PJ (near the bonding portion A) toward the other end of the two-ply sheet PJ (near the gripped portion B). Then, the separation members 16 move in the width direction between the first sheet P1 and the second sheet P2 at the other end of the two-ply sheet PJ.

Figure 11C:
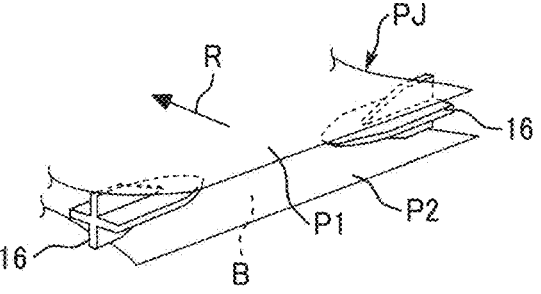
Figure 11D:
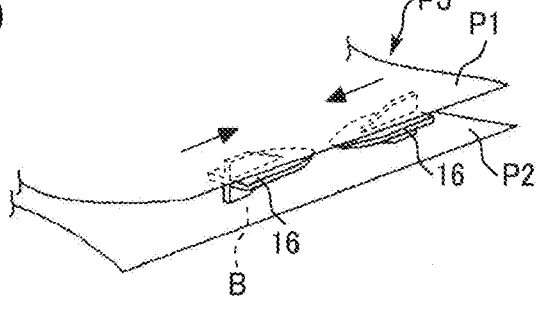

Specifically, the controller 90 controls the driving device 76 (see FIG. 13) to move the separation members 16 functioning as a pair of separation members or plates as follows. As illustrated in FIGS. 11B and 11C, the separation members 16 are inserted into both ends of the gap C in the width direction of the two-ply sheet PJ and relatively move to the other end of the two-ply sheet PJ that is the gripped portion B. After the separation members 16 functioning as a pair of separation members or plates have relatively moved to the other end of the two-ply sheet PJ, as illustrated in FIG. 11D, the separation members 16 on the other end of the two-ply sheet PJ move in the width direction from both ends of the two-ply sheet PJ to the center of the two-ply sheet PJ between the first sheet P1 and the second sheet P2.

In order to cause the separation members 16 to move as described above, the driving device 76 causes the separation members 16 to move from the standby positions to the positions at which the separation members 16 come close to each other.

Such a mechanism as the above-described driving device 76 includes the winding roller 20 to wind the two-ply sheet PJ and the separation members 16 to be inserted into the two-ply sheet PJ so as to separate the two-ply sheet PJ. When compared with a mechanism using a large-scale device such as a vacuum device to separate the two-ply sheet PJ, the mechanism such as the above-described driving device 76 reduces the size of the sheet separation device 1 included in the sheet laminator 50. In other words, without increasing the size of the sheet laminator 50, the above-described mechanism can preferably separate the first sheet P1 and the second sheet P2 of the two-ply sheet PJ.

In particular, since the separation members 16 according to the present embodiment move over substantially the entire area in the width direction of the two-ply sheet PJ on the other end of the two-ply sheet PJ (i.e., the trailing end of the two-ply sheet PJ), the separation members 16 sufficiently separate (peel) the other ends of the first sheet P1 and the second sheet P2 of the two-ply sheet PJ, the other ends being opposite the bonding portion A. For this reason, it is less likely that the above-described configuration causes an inconvenience that the other end of the two-ply sheet PJ that is opposite the bonding portion A is not sufficiently separated, and that this insufficient separation prevents the inner sheet PM (see FIG. 11E) from being inserted into the other end of the two-ply sheet PJ from the other end of the two-ply sheet PJ. Further, the above-described configuration allows the separation members 16 to easily function as a switcher or switching plates, in other words, to separately guide the first sheet P1 and the second sheet P2 to the first branched sheet conveyance passage K4 and the second branched sheet conveyance passage K5, respectively. A detailed description of the separation members 16 serving as a switcher is given below.

A description is given of the separation members 16 each functioning as a switcher or a switching plate.

In the present embodiment, the separation members 16 functioning as a separator or separation plates also function as a switcher or switching plates that guide the first sheet P1 and the second sheet P2 separated by the separation members 16, to the first branched sheet conveyance passage K4 and the second branched sheet conveyance passage K5 branching off in different directions, respectively.

More specifically, as illustrated in FIG. 8C, the first branched sheet conveyance passage K4 and the second branched sheet conveyance passage K5 branch off in different directions from the third sheet conveyance passage K3 between the winding roller 20 and each of the separation members 16 (separation members or plates). To be more specific, the first branched sheet conveyance passage K4 branches upward from the third sheet conveyance passage K3, and the second branched sheet conveyance passage K5 branches downward from the third sheet conveyance passage K3.

As illustrated in FIGS. 8A, 8B, and 8C, after the separation members 16 are inserted into the gap C, the third conveyance roller pair 6 conveys the two-ply sheet PJ to the one end (i.e., the left side in FIGS. 8A, 8B, and 8C) so that the winding of the other end of the two-ply sheet PJ on the winding roller 20 is released (see FIGS. 11A, 11B, and 11C). After the winding of the other end of the two-ply sheet PJ on the winding roller 20 is released, the separation members 16 move to the center in the width direction of the two-ply sheet PJ as illustrated in FIG. 11D, and then stop at the center in the width direction of the two-ply sheet PJ. Then, while the separation members 16 remain at the center in the width direction of the two-ply sheet PJ, the third conveyance roller pair 6 conveys the two-ply sheet PJ to the other end (i.e., the right side in FIGS. 8A, 8B, and 8C) again. Then, the separation members 16 guide the first sheet P1 and the second sheet P2 separated by the separation members 16, to the first branched sheet conveyance passage K4 and the second branched sheet conveyance passage K5, respectively. In other words, the controller 90 causes the separation members 16 to guide the two sheets (i.e., the first sheet P1 and the second sheet P2) separated by the separation members 16, to the two branched sheet conveyance passages (i.e., the first branched sheet conveyance passage K4 and the second branched sheet conveyance passage K5) separately. Consequently, the first sheet P1 is guided to the first branched sheet conveyance passage K4, and the second sheet P2 is guided to the second branched sheet conveyance passage K5. Subsequently, as illustrated in FIGS. 9A, 9B, 9C, and 11E, the controller 90 causes the separation members 16 to move to the standby positions, and then causes the second conveyance roller pair 5 to convey the inner sheet PM to the one end of the third sheet conveyance passage K3 (i.e., the right side in FIGS. 9A, 9B, and 9C), to insert the inner sheet PM between the first sheet P1 and the second sheet P2 separated from the two-ply sheet PJ.

As described above, each of the separation members 16 in the present embodiment functions as a separator or a separation plate that separates (in other words, peels) the non-bonding portion of the first sheet P1 and the second sheet P2 of the two-ply sheet PJ, and also functions as a switcher or switching plates that separately guide the separated two sheets, which are the first sheet P1 and the second sheet P2, to the first branched sheet conveyance passage K4 and the second branched sheet conveyance passage K5, respectively. Accordingly, the above-described configuration of the separation members reduces the size and cost of the sheet laminator 50, when compared with the configuration of a sheet separation device including the separator and the switcher as different units. In other words, the above-described configuration of the separation members efficiently and preferably can separate the first sheet P1 and the second sheet P2 of the two-ply sheet PJ.

The seventh sensor 47 optically detects that the first sheet P1 separated from the second sheet P2 is successfully conveyed to the first branched sheet conveyance passage K4. Further, the eighth sensor 48 optically detects that the second sheet P2 separated from the first sheet P1 is successfully conveyed to the second branched sheet conveyance passage K5.

Each separation member 16 in the present embodiment functions as a separator (separation plates) and a switcher (switching plates). However, the sheet separation device 1 of the sheet laminator 50 according to the present embodiment may further include a member that functions as a switcher (switching plates), different from the separation members 16 that function as separation members or plates.

A description is now given of the first guide 25 included in the sheet laminator 50 according to the present embodiment, with reference to FIGS. 7A and 7C.

The first guide 25 is disposed between the winding roller 20 and each of the separation members 16 in the third sheet conveyance passage K3. The first guide 25 functions as a limiter to limit the amount of slack (in other words, a deflection amount) of the first sheet P1 that is wound around the winding roller 20 on the inner side of the first sheet P1 and the second sheet P2 of the two-ply sheet PJ wound around the winding roller 20.

More specifically, the first guide 25 that functions as a limiter is a conveyance guide disposed on the side in which the winding roller 20 is disposed with respect to an imaginary plane S1 (i.e., above the imaginary plane S1 in FIG. 7A) in the third sheet conveyance passage K3. The imaginary plane S1 is an imaginary plane passing through the winding start position W of the winding roller 20 and the nip region of the third conveyance roller pair 6 in the third sheet conveyance passage K3 (see FIG. 7A). The first guide 25 has a shape like substantially a triangular prism having a plane separated from the winding roller 20 by a predetermined gap along the outer circumferential surface of the winding roller 20, and the plane covers a part of the outer circumferential surface of the winding roller 20. The first guide 25 functions as a conveyance guide of the third sheet conveyance passage K3 and a conveyance guide of the first branched sheet conveyance passage K4. In other words, the first guide 25 guides the sheet conveyed through the third sheet conveyance passage K3, the sheet conveyed through the first branched sheet conveyance passage K4, and the sheet wound around the winding roller 20.

In particular, in the third sheet conveyance passage K3, the first guide 25 limits upward bending of the two-ply sheet PJ (in particular, upward bending of the first sheet P1) between the winding roller 20 and the third conveyance roller pair 6. Due to such a configuration, the gap C in the two-ply sheet PJ that is formed by bending the first sheet P1 upward is intensively formed between the first guide 25 and the third conveyance roller pair 6. Accordingly, the above-described configuration increases the size of the gap C without increasing the winding amount of the two-ply sheet PJ wound around the winding roller 20, and the separation members 16 are smoothly inserted into the gap C to separate the two-ply sheet PJ.

Further, a description is given of a second guide 26 included in the sheet laminator 50 according to the present embodiment, with reference to FIGS. 7A and 7C. The second guide 26 is disposed between the winding roller 20 and each of the separation members 16 in the third sheet conveyance passage K3. The second guide 26 functions as a guide to guide the second sheet P2 that is an outer sheet of the two sheets P1 and P2 of the two-ply sheet PJ wound around the winding roller 20.

More specifically, the second guide 26 that functions as a guide is a sheet conveyance guide disposed on the side in which the winding roller 20 is not disposed with respect to the imaginary plane S1 (i.e., below the imaginary plane S1) in FIG. 7A, in the third sheet conveyance passage K3. The second guide 26 is disposed to face the lower face of the sheet from a portion close to and upstream from the second conveyance roller pair 5 in the sheet conveyance direction to a portion close to and downstream from the third convey-ance roller pair 6 in the sheet conveyance direction. In other words, the second guide 26 guides the sheet conveyed in the third sheet conveyance passage K3.

In particular, in the third sheet conveyance passage K3 between the winding roller 20 and the third conveyance roller pair 6, a clearance between the first guide 25 and the second guide 26 is set to be a value by which the sheet having the largest thickness can be conveyed. Since this setting limits a gap between the first sheet P1 and the second sheet P2 of the two-ply sheet PJ so as not to be too large between the first guide 25 and the second guide 26, the gap C in the two-ply sheet PJ (in particular, the upward bending of the first sheet P1) is intensively formed. Accordingly, the separation members 16 can be smoothly inserted into the gap C to separate the two-ply sheet PJ.

A description is given of the sixth sensor 46, with refer-ence to, for example, FIG. 7A.

The sixth sensor 46 functions as an abnormal condition detection sensor or an abnormal condition detector to detect an abnormal condition in which the gap C formed between the first sheet P1 and the second sheet P2 at a predetermined position (that is, a position between the third conveyance roller pair 6 and the winding roller 20) is not larger than a predetermined size before the separation members 16 move from the standby positions, to be more specific, before the separation members 16 move from the standby positions illustrated in FIG. 13 to the separation positions illustrated in FIGS. 10 and 11A. The predetermined size is the size of the gap C into which the separation members 16 enter, which is determined by experiments. In other words, the sixth sensor 46 that functions as the abnormal condition detector detects the abnormal condition in which the gap C formed between the first sheet P1 and the second sheet P2 at a predetermined position is not larger than the predetermined size before the separation members 16 are inserted into the gap C.

In other words, at a timing at which the gap C is formed between the first sheet P1 and the second sheet P2, as illustrated in FIGS. 6D and 7A, the sixth sensor 46 that functions as the abnormal condition detector detects the abnormal condition such as a state in which the gap is not formed at all or a state in which the gap is not formed as a sufficient gap C.

In the present embodiment, the controller 90 notifies occurrence of an abnormal condition when the abnormal condition is detected by the sixth sensor 46 (serving as an abnormal condition detector). More specifically, as illus-trated in FIG. 1, the sheet laminator 50 includes the opera-tion display panel 49 serving as an operation display device on the exterior of the sheet laminator 50 to display various kinds of information about the sheet laminator 50 and input various kinds of commands of the sheet laminator 50 by the user. When the controller 90 determines the abnormal con-dition of the two-ply sheet PJ based on the results detected by the sixth sensor 46, in other words, when the two-ply sheet PJ does not have the sufficiently large gap C having a sufficient clearance in the two-ply sheet PJ, the controller 90 controls the operation display panel 49 to display that the abnormal condition is detected. For example, the operation display panel 49 displays "Since an abnormal condition has occurred, the process of inserting the inner sheet is stopped. Please check the setting direction of the two-ply sheet in the unit sheet tray. If the setting direction is correct and similar abnormal conditions are repeated, please contact a service person."

The above-described sixth sensor 46 that functions as the abnormal condition detector may be, for example, a lever type sensor that comes into contact with the upper first sheet P1 of the two-ply sheet PJ forming the gap C larger than the predetermined size.

A description is given of the operations performed in the sheet laminator 50 when the sheet separating operation and the sheet inserting operation are performed on the plurality of two-ply sheets PJ in the normal condition (i.e., not in the abnormal condition), with reference to FIGS. 5A to 9C.

Further, in the description of the operations, the opera-tions of the separation members 16 are appropriately described with reference to FIGS. 10, 11A, 11B, 11C, 11D, and 11E, and the control flow is described with reference to a flowchart of FIGS. 12A and 12B.

Figure 12A:
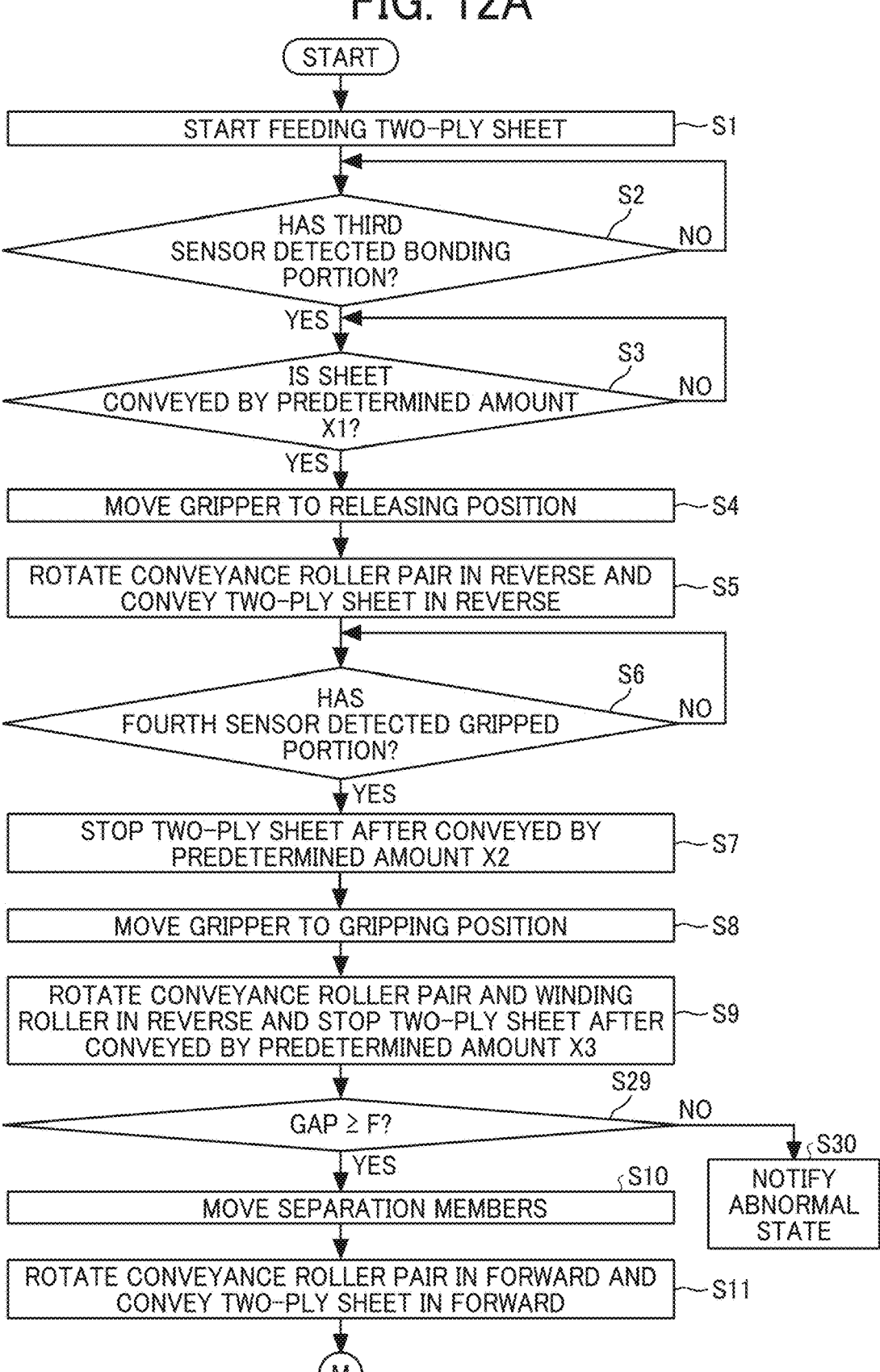
FIG. 12A is the first half of a flowchart of a flow of a control process executed in the sheet laminator.

FIG. 12A is the first half of a flowchart of a flow of a control process executed in the sheet laminator 50.

Figure 12B:
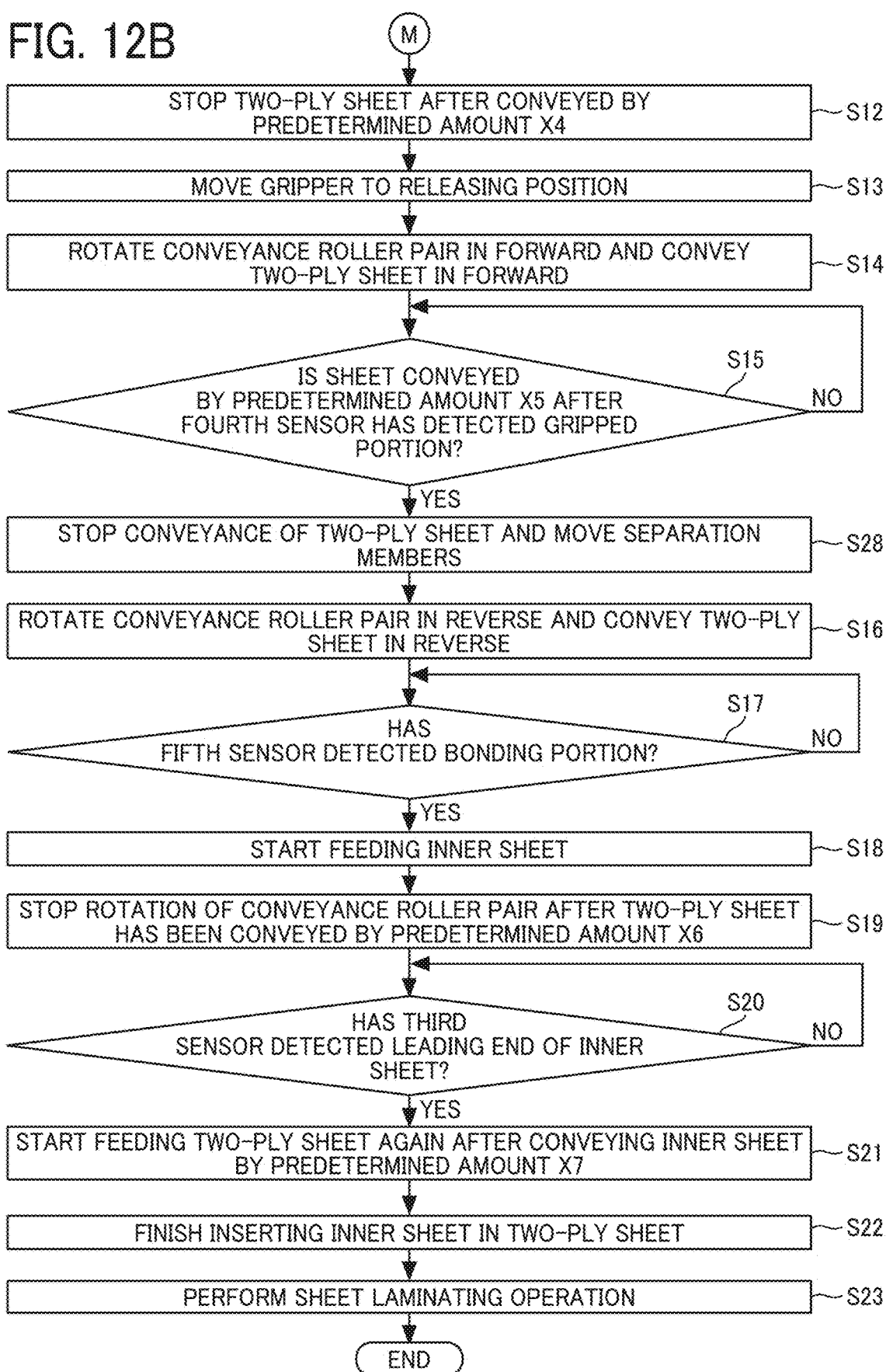
FIG. 12B is the second half of the flowchart of the flow of the control process of FIG. 12A.

FIG. 12B is the second half of the flowchart of the flow of the control process of FIG. 12A.

First, the first feed roller 2 and the first conveyance roller pair 4 start feeding the two-ply sheet PJ (i.e., the preceding two-ply sheet PJ1) from the first sheet tray 11 in step S1 of FIG. 12A. Then, as illustrated in FIG. 5A, the second conveyance roller pair 5 conveys the two-ply sheet PJ with the bonding portion A as the leading end of the two-ply sheet PJ in the forward direction that is a direction from the right side to the left side in FIG. 5A in the third sheet conveyance passage K3.

At this time, the controller 90 causes the movement mechanism 30 to position the gripper 32 at the gripping position.

In other words, the cam 34 rotates to move to a rotational position at which the cam 34 does not press the arm 31. When the gripper 32 is located at the gripping position as described above, the gripper 32 does not interrupt convey-ance of the sheet in the third sheet conveyance passage K3. The separation members 16 stand by at the standby positions (i.e., the positions illustrated in FIG. 11A) at which the separation members 16 cannot interrupt conveyance of the sheet in the third sheet conveyance passage K3.

Then, as illustrated in FIG. 5B, the controller 90 deter-mines whether the third sensor 43 has detected the bonding portion A of the two-ply sheet PJ (i.e., the leading end of the two-ply sheet PJ conveyed in the forward direction, in other words, the one end of the two-ply sheet PJ), in step S2 of FIG. 12A. When the third sensor 43 has not detected the bonding portion A of the two-ply sheet PJ (NO in step S2 of FIG. 12A), step S2 is repeated until the third sensor 43 detects the bonding portion A of the two-ply sheet PJ. By
contrast, when the third sensor 43 has detected the bonding
portion A of the two-ply sheet PJ (YES in step S2 of FIG.
12A), in response to the timing of detection of the bonding
portion A of the two-ply sheet PJ by the third sensor 43, the
controller 90 causes the third conveyance roller pair 6 to
convey the two-ply sheet PJ in the forward direction by a
predetermined amount X1 until the gripped portion B of the
two-ply sheet PJ (i.e., the trailing end of the two-ply sheet
PJ conveyed in the forward direction, in other words, the
other end of the two-ply sheet PJ) passes the position of the
winding roller 20, in step S3 of FIG. 12A.

As illustrated in FIG. 5C, the controller 90 causes the third
conveyance roller pair 6 to temporarily stop conveyance of
the two-ply sheet PJ conveyed by the predetermined amount
X1 and causes the gripper 32 to move from the gripping
position to the releasing position in step S4 of FIG. 12A. In
other words, the controller 90 causes the cam 34 to move to
a rotational position at which the cam 34 pushes the arm 31.
While the cam 34 presses the arm 31, the gripped portion B
of the two-ply sheet PJ can be received between the gripper
32 and the receiving portion 20b of the winding roller 20.

Then, as illustrated in FIG. 5D, the controller 90 causes
the third conveyance roller pair 6 to rotate in the reverse
direction to start conveyance of the two-ply sheet PJ in the
reverse direction in step S5 of FIG. 12A. At this time, the
fourth sensor 44 detects the gripped portion B of the two-ply
sheet PJ (i.e., the other end of the two-ply sheet PJ and the
leading end of the two-ply sheet PJ conveyed in the reverse
direction).

More specifically, the controller 90 determines whether
the fourth sensor 44 detects the gripped portion B of the
two-ply sheet PJ, in step S6 of FIG. 12A. When the fourth
sensor 44 has not detected the gripped portion B of the
two-ply sheet PJ (NO in step S6 of FIG. 12A), step S6 is
repeated until the fourth sensor 44 detects the gripped
portion B of the two-ply sheet PJ. When the fourth sensor 44
has detected the gripped portion B of the two-ply sheet PJ
(YES in step S6 of FIG. 12A), as illustrated in FIG. 6A, the
controller 90 causes the third conveyance roller pair 6 to
convey the two-ply sheet PJ by a predetermined amount X2,
in response to the detection of the gripped portion B of the
two-ply sheet PJ, until the gripped portion B of the two-ply
sheet PJ reaches the position of the winding roller 20 (i.e.,
the winding start position W) and then causes the third
conveyance roller pair 6 to stop conveyance of the two-ply
sheet PJ, in step S7 of FIG. 12A.

After the gripped portion B of the two-ply sheet PJ
reaches the winding start position W, as illustrated in FIG.
6B, the controller 90 causes the gripper 32 to move from the
releasing position to the gripping position, in step S8 of FIG.
12A. In other words, the controller 90 causes the cam 34 to
move to a rotational position at which the cam 34 does not
press the arm 31. While the cam 34 is at the rotational
position at which the cam 34 does not press the arm 31, as
illustrated in FIG. 6B', the end surface of the other end of the
two-ply sheet PJ does not contact any member, and the
gripped portion B of the two-ply sheet PJ is gripped between
the gripper 32 and the receiving portion 20b.

Then, as illustrated in FIG. 6C, the controller 90 causes
the winding roller 20 to rotate in the reverse direction (i.e.,
the counterclockwise direction) with the gripper 32 gripping
the two-ply sheet PJ, and then causes the third conveyance
roller pair 6 to rotate again in the reverse direction together
with the winding roller 20. At this time, as the winding roller
20 rotates, the gap C is formed between the first sheet P1 and
the second sheet P2 of the two-ply sheet PJ between the winding roller 20 and the third conveyance roller pair 6, as
illustrated in FIG. 6D. As the gap C is formed, the first guide
25 and the second guide 26 limit the warp (slack) of the
two-ply sheet PJ in the vicinity of the winding roller 20. As
a result, the gap C of the two-ply sheet PJ is intensively
formed near the third conveyance roller pair 6.

As described above, the fourth sensor 44 is disposed
downstream from the third conveyance roller pair 6 in the
reverse direction and the controller 90 causes the fourth
sensor 44 to detect the leading end of the two-ply sheet PJ
conveyed in the reverse direction. In response to the detec-
tion of the leading end of the two-ply sheet PJ by the fourth
sensor 44, the controller 90 determines the timing at which
the gripper 32 grips the two-ply sheet PJ. Due to such a
configuration, the gripped portion B of the two-ply sheet PJ
can be accurately conveyed to a desired gripping position
regardless of variations in the sheet lengths with respect to
the required sheet conveyance amount X2. The size of sheets
varies even if the sheets are sold as the same size.

Further, the required sheet conveyance amount X2 from
the detection of the leading end of the two-ply sheet PJ in the
reverse direction by the fourth sensor 44 can be reduced
regardless of the sheet length. For this reason, the above-
described configuration can reduce variation in the sheet
conveyance amount X2 and can accurately convey the
gripped portion B of the two-ply sheet PJ to the desired
gripping position.

Accordingly, the fourth sensor 44 is preferably disposed
at the position near the winding roller 20.

Further, a description is given of a mechanism that
generates the gap C in the two-ply sheet PJ, with reference
to FIG. 6C'. The gap C is generated in the two-ply sheet PJ
between the winding roller 20 and the third conveyance
roller pair 6 by winding the two-ply sheet PJ around the
winding roller 20.

The detailed description is given of the mechanism as
follows.

The two-ply sheet PJ wound around the winding roller 20
is gripped by the gripper 32, restricting displacement in the
two-ply sheet PJ. Due to this configuration, a slip is gener-
ated between the first sheet P1 and the second sheet P2 by
the amount of difference in the circumferential length of the
winding roller 20. Due to the slip, the conveyance amount of
the inner sheet (i.e., the first sheet P1) is smaller than the
conveyance amount of the outer sheet (i.e., the second sheet
P2). As a result, warp (slack) is generated in the inner sheet
(i.e., the first sheet P1) between the nip region of the third
conveyance roller pair 6 and the winding roller 20. At this
time, as the two-ply sheet PJ is wound around the winding
roller 20 by one or more rounds, the difference in the
winding circumferential length is generated between the
inner circumference and the outer circumference by the
thickness of the sheet. As a result, the warp (slack) is
additionally generated.

Specifically, a distance from the rotary shaft 20a (i.e., the
center of the shaft) of the winding roller 20 to the outer sheet
P2 is R+ΔR when a distance from the rotary shaft 20a (i.e.,
the center of the shaft) of the winding roller 20 to the inner
sheet P1 is R, and the thickness of the inner sheet P1 is ΔR.
Since the radius of the first sheet P1 wound around the inner
side of the winding roller 20 and the radius of the second
sheet P2 wound around the outer side of the first sheet P1 are
different by the thickness ΔR of the first sheet P1 (wound
around the inner side of the winding roller 20), a circum-
ferential length difference of 2×ΔR×π is generated between
the inner sheet (i.e., the first sheet P1) and the outer sheet
(i.e., the second sheet P2) when the two-ply sheet PJ is wound around the winding roller 20 by one round. As a result, where the number of winding the two-ply sheet PJ around the winding roller 20 is M times, the slack of the inner sheet (i.e., the first sheet P1) is generated by the circumferential length difference of 2×ΔR×π×M.

Finally, the warp (slack) is accumulated between the third conveyance roller pair 6 and the winding roller 20, and the gap C corresponding to 2×ΔR×π×M is formed between the first sheet P1 and the second sheet P2.

Then, the controller 90 causes the third conveyance roller pair 6 and the winding roller 20 to rotate in the reverse direction. At the timing at which the third conveyance roller pair 6 has conveyed the two-ply sheet PJ by a predetermined amount X3 since the start of winding of the two-ply sheet PJ by the winding roller 20, the controller 90 causes the third conveyance roller pair 6 to stop conveyance of the two-ply sheet PJ and the winding roller 20 to stop winding the two-ply sheet PJ, as illustrated in FIG. 7A, in step S9 of FIG. 12A. While the conveyance and winding of the two-ply sheet PJ are stopped, the two-ply sheet PJ is wound around the winding roller 20 one or more times, and the gap C in the two-ply sheet PJ (i.e., the distance between the first sheet P1 and the second sheet P2 in the vertical direction) is sufficiently widened if the two-ply sheet PJ is normally separated.

When the gap C is sufficiently widened, the controller 90 determines whether the sixth sensor 46 detects that the gap C equal to or larger than a predetermined distance F is formed in the two-ply sheet PJ, in step S29 of FIG. 12A.

As a result, when the controller 90 determines that the gap C is the sufficiently large gap equal to or greater than the predetermined distance F, the controller 90 then determines that the subsequent sheet separating operations of the separation members 16 do not cause any failure and causes separation members 16 to be inserted into the gap C sufficiently widened in the two-ply sheet PJ, as illustrated in FIG. 7B, in step S10 of FIG. 12A. In other words, as illustrated in FIGS. 10 and 11A, each of the separation members 16 in pair is moved from the standby position to the separation position.

Then, as illustrated in FIG. 7C, while the separation members 16 are inserted in the gap C, the controller 90 causes the third conveyance roller pair 6 and the winding roller 20 to start rotating in the forward direction (i.e., in the clockwise direction), in step S11 of FIG. 12A. In other words, as illustrated in FIGS. 11A, 11B, and 11C, the separation members 16 that are inserted in the gap C of the two-ply sheet PJ relatively move from the one end (i.e., the bonding portion A) to the other end (i.e., the gripped portion B) with respect to the two-ply sheet PJ. The above-described relative movement in the present embodiment is achieved by moving the two-ply sheet PJ itself in a direction indicated by arrow in FIGS. 11A, 11B, and 11C, without changing the positions of the separation members 16 in the sheet conveyance direction.

When the controller 90 determines that the sixth sensor 46 has detected the abnormal condition, in other words, when the controller 90 determines that the gap C in the two-ply sheet PJ is not the sufficiently large gap equal to or greater than the predetermined distance F (NO in step S29 of FIG. 12A), the controller 90 determines that the subsequent sheet separating operations by the separation members 16 cause various kinds of failures. For this reason, the controller 90 does not cause the separation members 16 to move from the standby positions to the separation positions. At this time, the controller 90 causes the operation display panel 49 (see FIG. 1) to notify a user or users that the occurrence of the abnormal condition stops the sheet separating operation of the two-ply sheet PJ and the sheet inserting operation of the inner sheet PM, in step S30 of FIG. 12A.

After step S11, as illustrated in FIG. 8A, the controller 90 causes the third conveyance roller pair 6 and the winding roller 20 to stop rotating in the forward direction after the third conveyance roller pair 6 has conveyed the two-ply sheet PJ in the forward direction by a predetermined amount X4, in step S12 of FIG. 12A. At this time, the gripped portion B of the two-ply sheet PJ is positioned on the third sheet conveyance passage K3 (i.e., at the winding start position W illustrated in FIG. 6B), which is a state in which the gripper 32 may release the gripped portion B. In addition, as illustrated in FIG. 11C, the controller 90 causes the separation members 16 to stop near the other end of the two-ply sheet PJ after the separation members 16 are inserted into the gap C of the two-ply sheet PJ and relatively move to the other end (i.e., the gripped portion B) of the two-ply sheet PJ with respect to the two-ply sheet PJ.

While the separation members 16 are stopped near the other end of the two-ply sheet PJ, the controller 90 causes the gripper 32 to move from the gripping position to the releasing position in step S13 of FIG. 12B. In other words, the controller 90 causes the cam 34 to move to the rotational position at which the cam 34 does not press the arm 31. The gripper 32 releases gripping the two-ply sheet PJ. In the present embodiment, the cam 34 in the movement mechanism 30 moves to release the gripping of the two-ply sheet PJ by the gripper 32. However, when the pulling force by conveyance of the two-ply sheet PJ by the third conveyance roller pair 6 is greater than the gripping force of the gripper 32 to grip the two-ply sheet PJ, the gripping of the two-ply sheet PJ by the gripper 32 can be released by pulling the two-ply sheet PJ from the gripper 32 due to conveyance of the two-ply sheet PJ by the third conveyance roller pair 6 without moving the cam 34 in the movement mechanism 30.

After step S13, as illustrated in FIG. 8B, the controller 90 causes the third conveyance roller pair 6 to rotates in the forward direction again to start conveyance of the two-ply sheet PJ in the forward direction, in step S14 of FIG. 12B. In addition, after the gripped portion B of the two-ply sheet PJ (i.e., the other end of the two-ply sheet PJ and the trailing end of the two-ply sheet PJ in the forward direction) passes over the branching point between the third sheet conveyance passage K3 and each of the first branched sheet conveyance passage K4 and the second branched sheet conveyance passage K5, the controller 90 causes the gripper 32 to move from the releasing position to the gripping position. Further, at this time, the fourth sensor 44 detects the gripped portion B of the two-ply sheet PJ (i.e., the other end of the two-ply sheet PJ and the trailing end of the two-ply sheet PJ conveyed in the forward direction). After the fourth sensor 44 has detected the trailing end of the two-ply sheet PJ in the forward direction, the controller 90 determines whether the third conveyance roller pair 6 conveys the two-ply sheet PJ by a predetermined amount X5 in response to the timing of the detection of the trailing end of the two-two-ply sheet PJ by the fourth sensor 44, in step S15 of FIG. 12B. When the third conveyance roller pair 6 does not convey the two-ply sheet PJ by the predetermined amount X5 after the fourth sensor 44 has detected the gripped portion B of the two-ply sheet PJ (NO in step S15 of FIG. 12B), step S15 is repeated until the third conveyance roller pair 6 conveys the two-ply sheet PJ by the predetermined amount X5 after the fourth sensor 44 has detected the gripped portion B of the two-ply sheet PJ. By contrast, when the third conveyance roller pair 6 conveys the two-ply sheet PJ by the predetermined amount X5 after the fourth sensor 44 has detected the gripped portion B of the two-ply sheet PJ (YES in step S15 of FIG. 12B), as illustrated in FIG. 11D, the controller 90 causes the third conveyance roller pair 6 to stop conveying the two-ply sheet PJ and causes the separation members 16 to move in the width direction of the two-ply sheet PJ, in step S28 of FIG. 12B. As a result, as illustrated in FIG. 8B, the trailing ends of the first sheet P1 and the second sheet P2 of the two-ply sheet PJ conveyed in the forward direction are separated and largely opened (see FIG. 11D). At this time, the controller 90 starts to perform the sheet separating operation on the two-ply sheet PJ.

Then, as illustrated in FIG. 8C, the controller 90 causes the third conveyance roller pair 6 to rotate in the reverse direction to start conveyance of the two-ply sheet PJ in the reverse direction, in step S16 of FIG. 12B. At this time, since the separation members 16 are disposed at the switching positions at which the separation members 16 block entrance of the two-ply sheet PJ moving to the third sheet conveyance passage K3 (i.e., the position illustrated in FIG. 11D), the first sheet P1 and the second sheet P2 separated from each other are guided to the first branched sheet conveyance passage K4 and the second branched sheet conveyance passage K5, respectively, as illustrated in FIG. 8C. At this time, the fifth sensor 45 (see FIG. 1) detects the bonding portion A of the two-ply sheet PJ (i.e., the one end of the two-ply sheet PJ and the trailing end of the two-ply sheet PJ conveyed in the reverse direction). Subsequently, the controller 90 determines whether the fifth sensor 45 (see FIG. 1) that functions as a sheet detector or sheet sensor has detected the trailing end of the two-ply sheet PJ conveyed in the reverse direction (i.e., the bonding portion A), in step S17 of FIG. 12B. In response to detection of the trailing end of the two-ply sheet PJ in the reverse direction by the fifth sensor 45 (see FIG. 1), the controller 90 causes the second feed roller 3 to start feeding the inner sheet PM from the second sheet tray 12, in step S18 of FIG. 12B.

The timing at which the second feed roller 3 starts to feed the inner sheet PM is not limited to the above-described timing. It is preferable to set the timing to reduce the time to perform the sheet separating operation and the sheet inserting operation.

Subsequently, as illustrated in FIG. 9A, in response to the timing of detection of the trailing end of the two-ply sheet PJ in the reverse direction by the fifth sensor 45 (see FIG. 1), the controller 90 causes the third conveyance roller pair 6 to rotate to convey the two-ply sheet PJ by a predetermined amount X6, and stop the conveyance of the two-ply sheet PJ when the two-ply sheet PJ has been conveyed by the predetermined amount X6, in step S19 of FIG. 12B. When the third conveyance roller pair 6 conveys the two-ply sheet PJ by the predetermined amount X6, the bonding portion A of the two-ply sheet PJ is in the nip region of the third conveyance roller pair 6 or at a position slightly leftward from the nip region of the third conveyance roller pair 6. In other words, the one end of the two-ply sheet PJ is nipped by the third conveyance roller pair 6. With this state, the sheet separating operation of the two-ply sheet PJ is completed.

Further, before completion of the sheet separating operation of the two-ply sheet PJ, the controller 90 has already started feeding the inner sheet PM from the second sheet tray 12. Since the inner sheet PM is fed from the second sheet tray 12, as illustrated in FIG. 9A, when the sheet separating operation on the two-ply sheet PJ is completed, the leading end of the inner sheet PM (i.e., at one end of the inner sheet PM in the forward direction) has approached the position at which the inner sheet PM is inserted between the first sheet P1 and the second sheet P2 of the two-ply sheet PJ.

On the other hand, the third sensor 43 detects the leading end of the inner sheet PM (i.e., at the one end of the inner sheet PM in the forward direction). In addition, as illustrated in FIG. 9B, in response to the detection of the leading end of the inner sheet PM, the separation members 16 move to the respective standby positions at the timing at which the separation members 16 do not interrupt conveyance of the inner sheet PM.

Figure 11E:
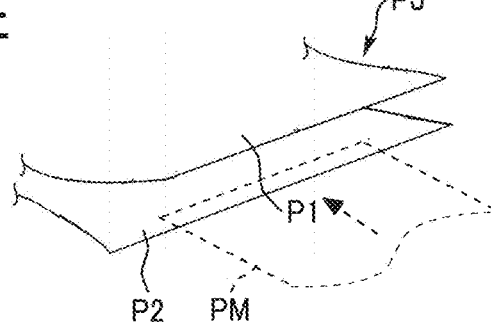

Further, as illustrated in FIGS. 9C and 11E, the controller 90 determines whether the third sensor 43 has detected the leading end of the inner sheet PM in the forward direction, in step S20 of FIG. 12B. When the third sensor 43 has not detected the leading end of the inner sheet PM in the forward direction (NO in step S20 of FIG. 12B), step S20 is repeated until the third sensor 43 has detected the leading end of the inner sheet PM in the forward direction. By contrast, when the third sensor 43 has detected the leading end of the inner sheet PM in the forward direction (YES in step S20 of FIG. 12B), in response to the timing of detection of the leading end of the inner sheet PM in the forward direction by the third sensor 43, the controller 90 causes the second conveyance roller pair 5 to convey the inner sheet PM by a predetermined amount X7. Then, the controller 90 causes the third conveyance roller pair 6 to start conveying the two-ply sheet PJ in the forward direction again, in step S21 of FIG. 12B. At this time, the inner sheet PM is accurately nipped at a desired position between the first sheet P1 and the second sheet P2 of the two-ply sheet PJ.

As described above, the controller 90 finishes the sheet inserting operation to insert the inner sheet PM in the two-ply sheet PJ, in other words, between the first sheet P1 and the second sheet P2 of the two-ply sheet PJ (step S22 of FIG. 12B).

The controller 90 then causes the third conveyance roller pair 6 to convey the two-ply sheet PJ with the inner sheet PM being inserted after the sheet separating operation, so that the two-ply sheet PJ passes through the fourth sheet conveyance passage K6 opened to conveyance of the two-ply sheet PJ by the switching member 17 to be conveyed to the sheet lamination device 51 by the third conveyance roller pair 6.

Then, the sheet lamination device 51 starts to perform the sheet laminating operation on the two-ply sheet PJ in which the inner sheet PM is inserted (step S23 of FIG. 12B).

After the sheet laminating operation has been performed on the two-ply sheet PJ' (i.e., the two-ply sheet PJ in which the inner sheet PM has been inserted), the two-ply sheet PJ' is ejected by the ejection roller pair 7 through an ejection port Z to be stacked on the ejection tray 13 (see FIG. 1, for example). Then, the process of the flowchart ends.

A description is given of the detailed configuration and operations of the sheet laminator 50 according to the present embodiment.

As described above with reference to the drawings including FIG. 1, the sheet laminator 50 is a sheet processing apparatus that performs sheet lamination (sheet laminating operation) on the two-ply sheet PJ in which an inner sheet PM is inserted between the two sheets, which are the first sheet P1 and the second sheet P2, and includes the thermal pressure roller pair 51a in the sheet lamination device 51.

Figure 14A:
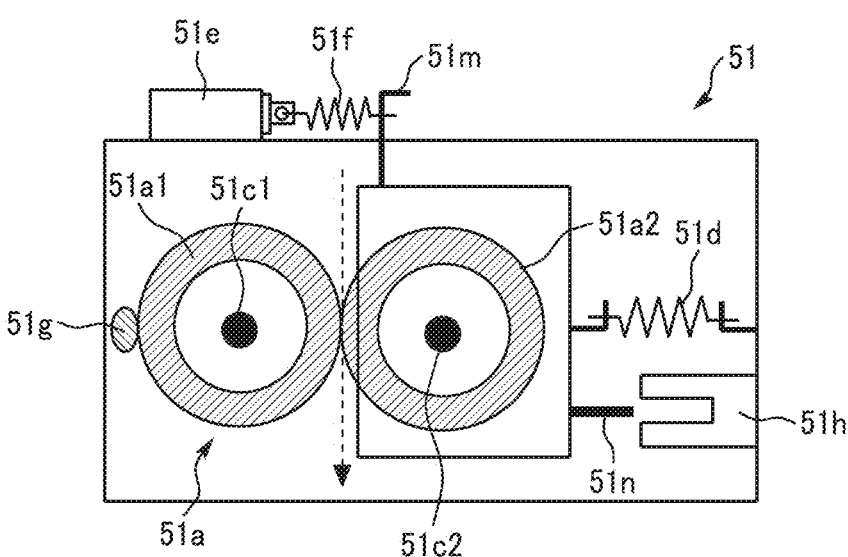
FIGS. 14A and 14B are cross-sectional views of a thermal pressure roller pair in contact and separation operations in a sheet lamination unit.
Figure 15A:
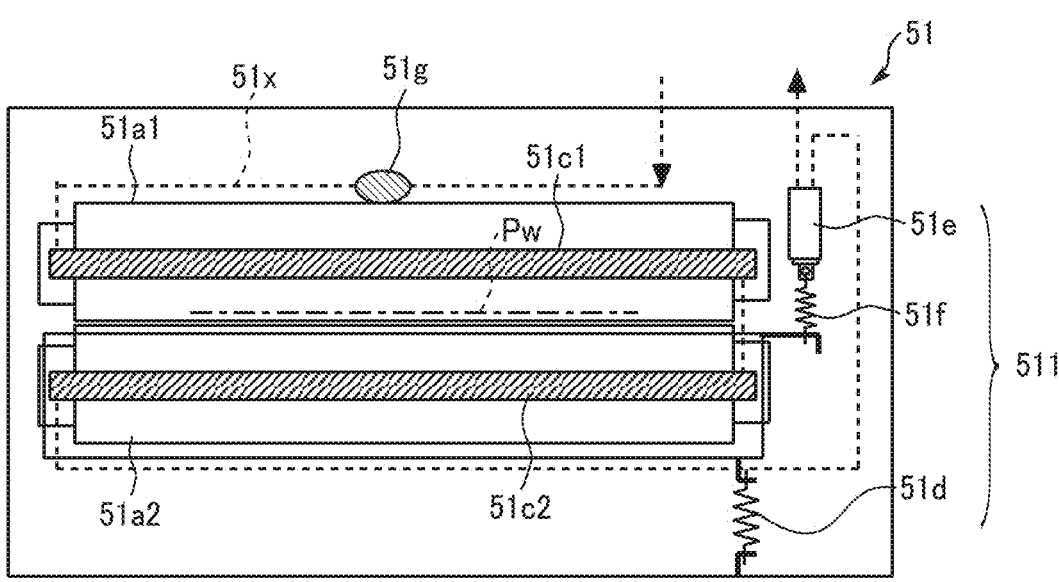
FIGS. 15A and 15B are cross-sectional views of the thermal pressure roller pair in the contact and separation operations in the sheet lamination unit, viewed in the width direction.

As illustrated in FIGS. 14A and 15A, the thermal pressure roller pair 51a includes a first roller 51a1 and a second roller 51a2. The first roller 51a1 and the second roller 51a2 are pressed against each other to form a nip region (fixing nip region) at which the two-ply sheet PJ (in which the inner sheet PM is inserted) is conveyed.

The first roller 51a1 internally includes a first heater 51c1 functioning as a first heater and is heated by the first heater 51c1 (first heater). Specifically, the first roller 51a1 is heated by radiant heat of the first heater 51c1 powered (energized) via the power line 51x by the power source controlled by the controller 90.

Similarly, the second roller 51a2 internally includes a second heater 51c2 functioning as a second heater and is heated by the second heater 51c2 (second heater). Specifically, the second roller 51a2 is heated by radiant heat of the second heater 51c2 powered (energized) via the power line 51x by the power source controlled by the controller 90.

The driving force is transmitted from the drive motor to the first roller 51a1 via the gear train, the first roller 51a1 is rotationally driven in the clockwise direction in FIG. 14A, and the second roller 51a2 is driven to rotate in the counterclockwise direction in FIG. 14A along with the rotation of the first roller 51a1.

As a result, the two-ply sheet PJ is conveyed in the direction indicated by the dashed arrow in FIG. 14A while being heated (sheet lamination performed) from both the front and back faces at the nip region between the first roller 51a1 and the second roller 51a2.

In the present embodiment, the first roller 51a1 and the second roller 51a2 are equally configured (made into a common component), and the first heater 51c1 and the second heater 51c2 are also equally configured (made into a common component). The first roller 51a1 and the second roller 51a2 heat both the front and back faces of the two-ply sheet PJ evenly at the nip region between the first roller 51a1 and the second roller 51a2. By so doing, a preferable sheet lamination (sheet laminating operation) can be performed on the two-ply sheet PJ.

As illustrated in, for example, FIGS. 14A, 14B, 15A, and 15B, the sheet lamination device 51 of the sheet laminator 50 according to the present embodiment includes a thermostat 51g functioning as a power cutoff device that senses a change in temperature of the first roller 51a1, the second roller 51a2, or both, and cuts off the power to the first heater 51c1 (first heater), the second heater 51c2 (second heater), or both.

Specifically, in the present embodiment, the thermostat 51g that senses a change in temperature of the roller surface of the first roller 51a1 is used as the power cutoff device. The thermostat 51g (power cutoff device) cuts off the power to the first heater 51c1, the second heater 51c2, and a solenoid 51e (movement mechanism 511) when the roller surface of the first roller 51a1 reaches a given temperature (a temperature set in advance so that thermal deterioration of the roller does not occur). The solenoid 51e and the movement mechanism 511 are described below.

Figure 15B:
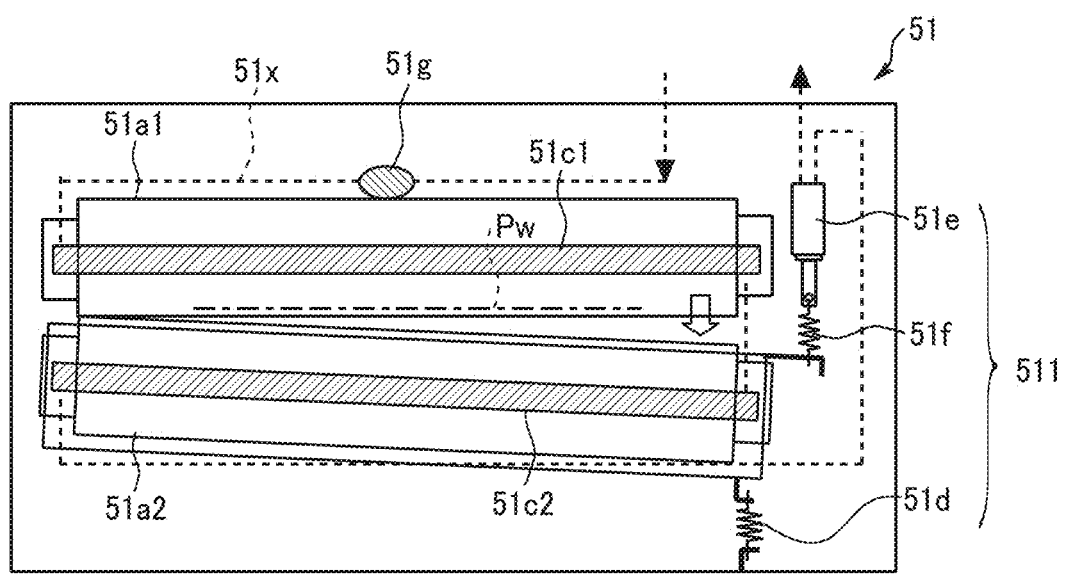
Figure 16:
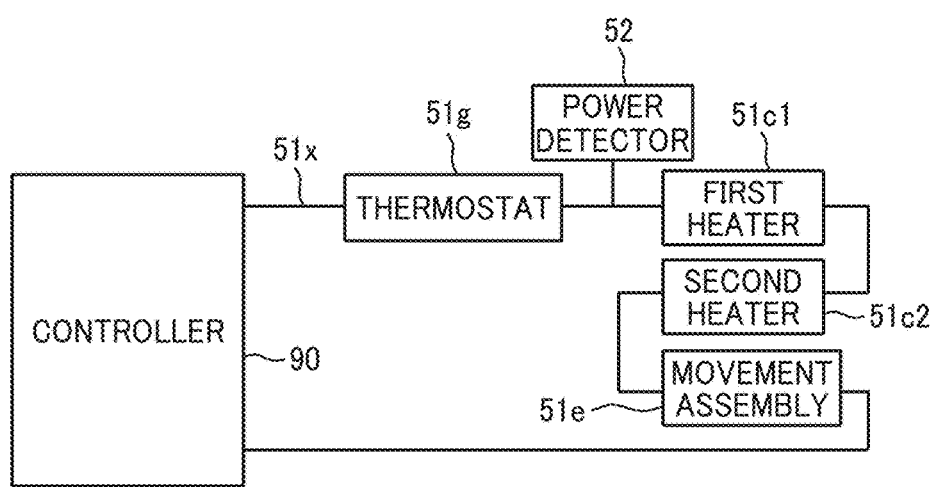
FIG. 16 is a block diagram illustrating a configuration of a current cutoff circuit.

More specifically, with reference to FIGS. 15A, 15B, and 16, the thermostat 51g (power cutoff device) is in contact with the roller surface (outer circumferential surface) of the first roller 51a1 and is electrically connected to the power line 51x (live) to form an electric current cutoff circuit.

In addition to the thermostat 51g, the first heater 51c1, the second heater 51c2, and the solenoid 51e (movement mechanism 511) to be described below are connected in series to the power line 51x (power cutoff passage) in this order on the downstream side in the direction in which the electric current flows.

In the normal state (when sheet lamination is performed), the controller 90 causes the electric current input from the power source to the power line 51x (power cutoff passage)

to flow in the direction indicated by the dashed arrow in FIG. 15A, and each of the first heater 51c1 and the second heater 15c2 functions as a heat source (heat).

On the other hand, when overtemperature that is an excessive temperature rise occurs in the first roller 51a1, which results in a temperature rise to an unexpected temperature, and the temperature sensed by the thermostat 51g reaches a given temperature (when an abnormal condition occurs), the electric current flowing through the power line 51x is cut off by the thermostat 51g, and neither the first heater 51c1 nor the second heater 15c2 functions as the heat source (do not heat).

As a result, the failure that a thermal deterioration occurs on the first roller 51a1 and the second roller 51a2 due to overtemperature is reduced or prevented.

A description is given of the sheet lamination device 51 of the sheet laminator 50 according to the present embodiment, with reference to the drawings including FIGS. 14A, 14B, 15A, and 15B.

As illustrated in FIGS. 14A, 14B, 15A, and 15B, the sheet lamination device 51 of the sheet laminator 50 includes the movement mechanism 511 (51e, 51f, and 51d) that move the second roller 51a2 relative to the first roller 51a1 so that the nip region with respect to a conveyance area Pw in the width direction of the two-ply sheet PJ. The conveyance area Pw is a conveyance area of a two-ply sheet PJ having a maximum conveyable size, as illustrated in FIGS. 15A and 15B.

Specifically, the movement mechanism 511 includes, for example, the solenoid 51e, a first tension spring 51f, a second tension spring 51d. The solenoid 51e is fixed to the housing of the sheet lamination device 51, and one end side of the first tension spring 51f is coupled to the plunger of the solenoid 51e. The other end side of the first tension spring 51f is coupled to a hook portion 51m protruding from a retainer that movably holds the second roller 51a2. The retainer is held by the housing of the sheet lamination device 51 to move in the direction of the white arrow in FIGS. 14A to 15B. The second tension spring 51d is coupled to the retainer that rotatably holds the second roller 51a2 at one end side of the second tension spring 51d. The other end side of the second tension spring 51d is coupled to the housing of the sheet lamination device 51.

Due to such a configuration as described above, in the normal state (when sheet lamination is performed), the controller 90 causes the electric current input from the power source to the power line 51x (power cutoff passage) to flow in the direction indicated by the dashed arrow in FIG. 15A, and the solenoid 51e is turned on. As a result, as illustrated in FIGS. 14A and 15A, the plunger of the solenoid 51e is attracted to the solenoid 51e against the spring force of the first tension spring 51f and the spring force of the second tension spring 51d. Then, the second roller 51a2 moves in a direction approaching the first roller 51a1, and the first roller 51a1 and the second roller 51a2 contact each other.

Figure 14B:
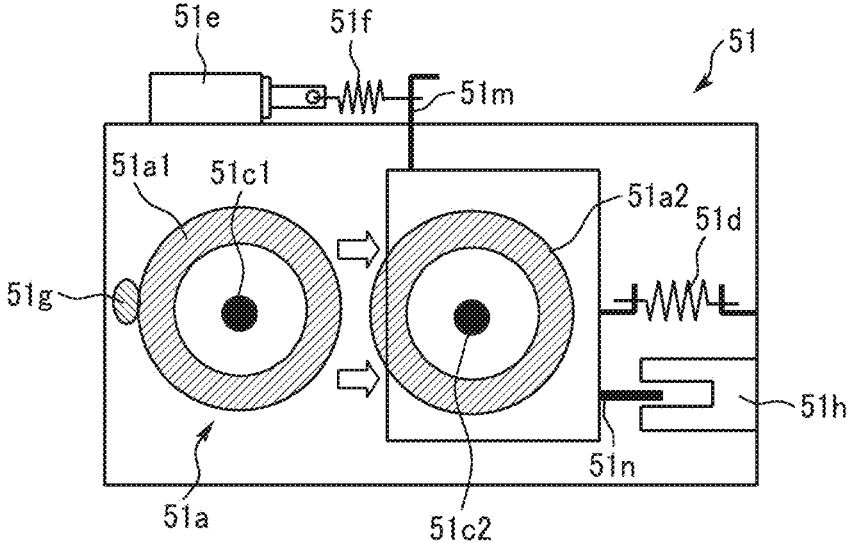

On the other hand, when the sensing temperature of the thermostat 51g reaches the given temperature (in other words, when overtemperature that is an excessive temperature rise occurs and results in an abnormal condition), the electric current flowing through the power line 51x is cut off by the thermostat 51g, and the power supplied to the solenoid 51e is cut off. As a result, as illustrated in FIGS. 14B and 15B, the attraction of the plunger of the solenoid 51e is released, the second roller 51a2 moves in the direction away from the first roller 51a1 due to the spring force of the first tension spring 51f and the spring force of the second tension spring 51d, and the first roller 51a1 and the second roller 51a2 separate from each other.

As described above, the solenoid 51e (the movement mechanism 511) moves the second roller 51a2 so as to contact the first roller 51a1 when the power is on, and moves the second roller 51a2 so as to be separated from the first roller 51a1 when the power is not supplied.

In other words, the thermostat 51g (power cutoff device) and the solenoid 51e (movement mechanism 511) are connected to the power line 51x. The movement mechanism 511 (51e, 51f, and 51d) causes the rollers of the thermal pressure roller pair 51a to contact or separate from each other depending on when the power is supplied or not.

The movement mechanism 511 is not limited to the above-described mechanism of the present embodiment. For example, even another mechanism such as a pinion rack mechanism can be used as the movement mechanism as long as the movement mechanism causes the thermal pressure roller pair 51a to contact or separate from each other depending on when the power is supplied or not.

As described above, in the sheet laminator 50 according to the present embodiment, when the thermostat 51g (power cutoff device) cuts off the power supplied to the first heater 51c1 (first heater), the second heater 51c2 (second heater), or both (in the present embodiment, both the first heater 51c1 and the second heater 51c2), the power to the movement mechanism 511 (51e, 51f, and 51d) via the power line 51x is also cut off, and the movement mechanism 511 (51e, 51f, and 51d) moves the second roller 51a2 relative to the first roller 51a1.

Due to such a configuration, even when overtemperature (excessive temperature rise) occurs in the thermal pressure roller pair 51a exceeding an appropriate temperature range, the nip region between the thermal pressure roller pair 51a is released, and the portion corresponding to the nip region between the first roller 51a1 and the second roller 51a2 are less likely to be thermally deteriorated in the same manner. As a result, the abnormal condition (lamination failure) is less likely to occur in the sheet lamination (sheet laminating operation) performed after the above operation. In other words, even when the overtemperature (excessive temperature rise) occurs in the thermal pressure roller pair 51a, the abnormal condition in sheet lamination (sheet laminating operation) less likely occurs.

In addition, since the thermostat 51g (power cutoff device) and the solenoid 51e (movement mechanism 511) are coupled to each other by the same power line 51x, even when, for example, runaway of the CPU (controller 90) occurs at the time of overtemperature (excessive temperature rise), which is an abnormal condition, the heater is turned off and the solenoid 51e (movement mechanism) performs the separation operation on the thermal pressure roller pair 51a according to power cutoff by the thermostat 51g (power cutoff device).

In the present embodiment, the thermostat 51g has a function of controlling the roller surface temperature of the first roller 51a1 (the thermal pressure roller pair 51a) to fall within a target temperature range (appropriate temperature range), in addition to the function of cutting off the power in the power line 51x when the overtemperature (excessive temperature rise) of the first roller 51a1 is sensed as described above. In other words, while the thermostat 51g controls the roller surface temperature of the thermal pressure roller pair 51a to fall within a target temperature range and perform a favorable sheet laminating operation (sheet lamination) when the sheet laminating operation (sheet lamination) is performed, the thermostat 51g cuts off the power when it is recognized that the roller surface temperature does not fall within the target temperature range due to, for example, a failure of the first heater 51c1 and the second heater 51c2 and the overtemperature (excessive temperature rise) cannot be restricted. When the power cutoff due to the overtemperature (excessive temperature rise) is performed as described above, separation of the thermal pressure roller pair 51a is also performed, and the sheet lamination (sheet laminating operation) is interrupted.

Further, when the normal sheet laminating operation is performed (when the thermal pressure roller pair 51a is activated), the electric current to the power line 51x is not cut off by the thermostat 51g, so that the rollers of the thermal pressure roller pair 51a contact each other, and when the sheet laminating operation is not performed (when the thermal pressure roller pair 51a is not activated), the electric current to the power line 51x is not supplied, so that the rollers of the thermal pressure roller pair 51a separate from each other.

As illustrated in the drawings such as FIGS. 15A and 15B, in the present embodiment, the movement mechanism 511 (51e, 51f, and 51d) moves the other end (the right end in FIGS. 15A and 15B) of the second roller 51a2 in the width direction in a direction away from the first roller 51a1 (downward in FIGS. 15A and 15B) around the one end (the left end in FIGS. 15A and 15B) of the second roller 51a2 in the width direction, without moving the first roller 51a1.

Specifically, the retainer that rotatably holds the second roller 51a2 is held by the housing of the sheet lamination device 51 so that the second roller 51a2 is rotatable about the one end of the second roller 51a2 in the width direction. The solenoid 51e, the first tension spring 51f, and the second tension spring 51d (included in the movement mechanism 511) described above are arranged at the other end of the second roller 51a2 in the width direction.

Due to such a configuration of the movement mechanism 511 (51e, 51f, and 51d) as described above, the movement mechanism 511 is simpler, more space-saving, and more cost-effective than the case where the movement mechanism 511 has a configuration that the second roller 51a2 is separated from the first roller 51a1 over the entire width direction.

However, in the movement mechanism 511 (51e, 51f, and 51d) having the above-described configuration, at the time of overtemperature (excessive temperature rise) occurring in the thermal pressure roller pair 51a, although the other end of the first roller 51a1 in the width direction is separated from the second roller 51a2 of the thermal pressure roller pair 51a (although the nip region is released), the one end of the first roller 51a1 in the width direction remains in contact with the second roller 51a2 of the thermal pressure roller pair 51a (the nip region is not released). As a result, thermal deterioration is likely to occur at the nip region. However, since the nip region (the nip region at the one end in the width direction) is a portion deviated from the conveyance area Pw, the quality of the sheet lamination (sheet laminating operation) is not affected even when thermal deterioration occurs.

With reference to FIGS. 14A and 14B, the sheet laminator 50 (the sheet lamination device 51) according to the present embodiment includes a photosensor 51h as an example of a movement detector that can detect whether the movement mechanism 511 (51e, 51f, and 51d) causes the second roller 51a2 to move relative to the first roller 51a1.

Specifically, the retainer that holds the second roller 51a2 has a detection target panel 51n and the sheet lamination device 51 includes the photosensor 51h of a transmissive type (movement detector) arranged on the housing. When the second roller 51$a2$ is in contact with the first roller 51$a1$ as illustrated in FIG. 14A, the detection target panel 51$n$ is not optically detected by the photosensor 51$h$. On the other hand, when the second roller 51$a2$ is separated from the first roller 51$a1$ as illustrated in FIG. 14B, the detection target panel 51$n$ is optically detected by the photosensor 51$h$. By so doing, the controller 90 determines whether the rollers of the thermal pressure roller pair 51$a$ are in contact with each other or are separated from each other.

The sheet laminator 50 (sheet lamination device 51) according to the present embodiment includes a power detector 52 that can detect whether the power is cut off by the thermostat 51$g$ (power cutoff device). As such the power detector 52, for example, a sensor that detects whether the electric current flows on the output side of the power line 51$x$ can be employed.

In a case where the thermostat 51$g$ (power cutoff device) is to cut off the power and the movement mechanism 511 (51$e$, 51$f$, and 51$d$) is to move the second roller 51$a2$ relative to the first roller 51$a1$ (at the time of overtemperature occurring in the thermal pressure roller pair 51$a$) but the photosensor 51$h$ (movement detector) and the power detector 52 detect that the power cutoff, the movement of the second roller 51$a2$ relative to the first roller 51$a1$, or both are not performed (detection of an abnormal condition), the detection result is notified to the user.

Figures 18, 19:
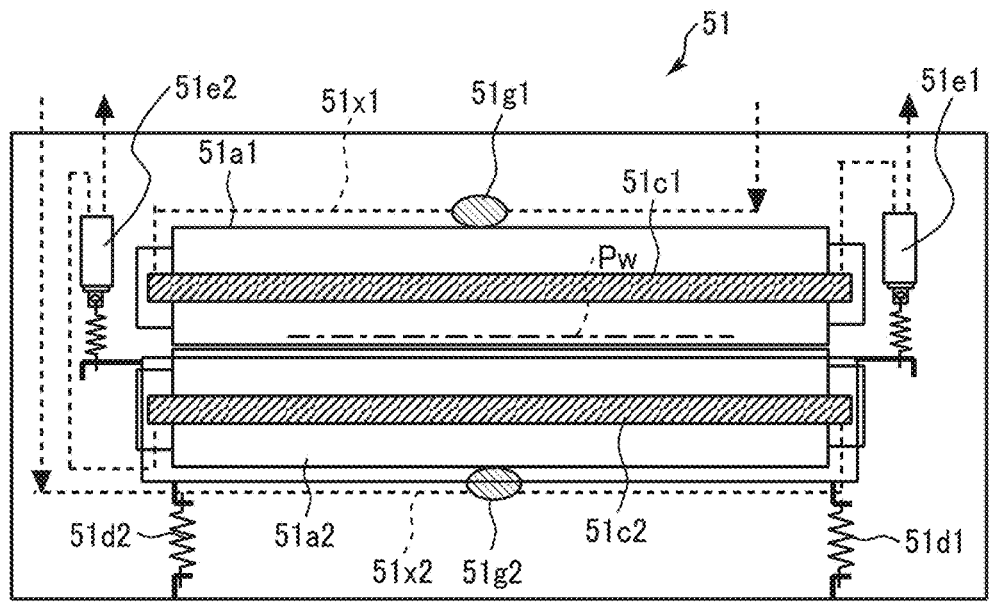
FIG. 18 is a table indicating the state of the sheet laminator when performing the current cutoff control and the contact and separation control of the thermal pressure roller pair.
FIG. 19 is a diagram illustrating the sheet lamination unit in the width direction as Modification 1.

Specifically, with reference to FIG. 18, the controller 90 determines that the sheet laminator 50 is in a normal state (1) in a case where the power detector 52 detects that the power is supplied to the first heater 51$c1$ and the second heater 51$c2$ and the photosensor 51$h$ detects that the rollers of the thermal pressure roller pair 51$a$ are in contact with each other, and (2) in a case where the power detector 52 detects that the power is not supplied to the first heater 51$c1$ and the second heater 51$c2$ and the photosensor 51$h$ detects that the rollers of the thermal pressure roller pair 51$a$ are separated from each other.

On the other hand, the controller 90 determines that (3) the electric current cutoff circuit has a failure when the power detector 52 detects that the power is supplied to the first heater 51$c1$ and the second heater 51$c2$ and the photosensor 51$h$ detects that the rollers of the thermal pressure roller pair 51$a$ are separated from each other, and (4) the solenoid 51$e$ (the movement mechanism 511) has a failure when the power detector 52 detects that the power is not supplied to the first heater 51$c1$ and the second heater 51$c2$ and the photosensor 51$h$ detects that the rollers of the thermal pressure roller pair 51$a$ are in contact with each other. When the controller 90 determines any of the above-described conditions, the controller 90 causes the operation display panel 49 (see FIG. 1) to display (notify the user of) the occurrence of such a failure on the screen. Then, in order to solve such a failure, the controller 90 retries the control at the time of overtemperature (excessive temperature rise) described above or prompts a service man call, so as to control the sheet laminator 50 to interrupt the operation until the failure is eliminated.

Figure 17:
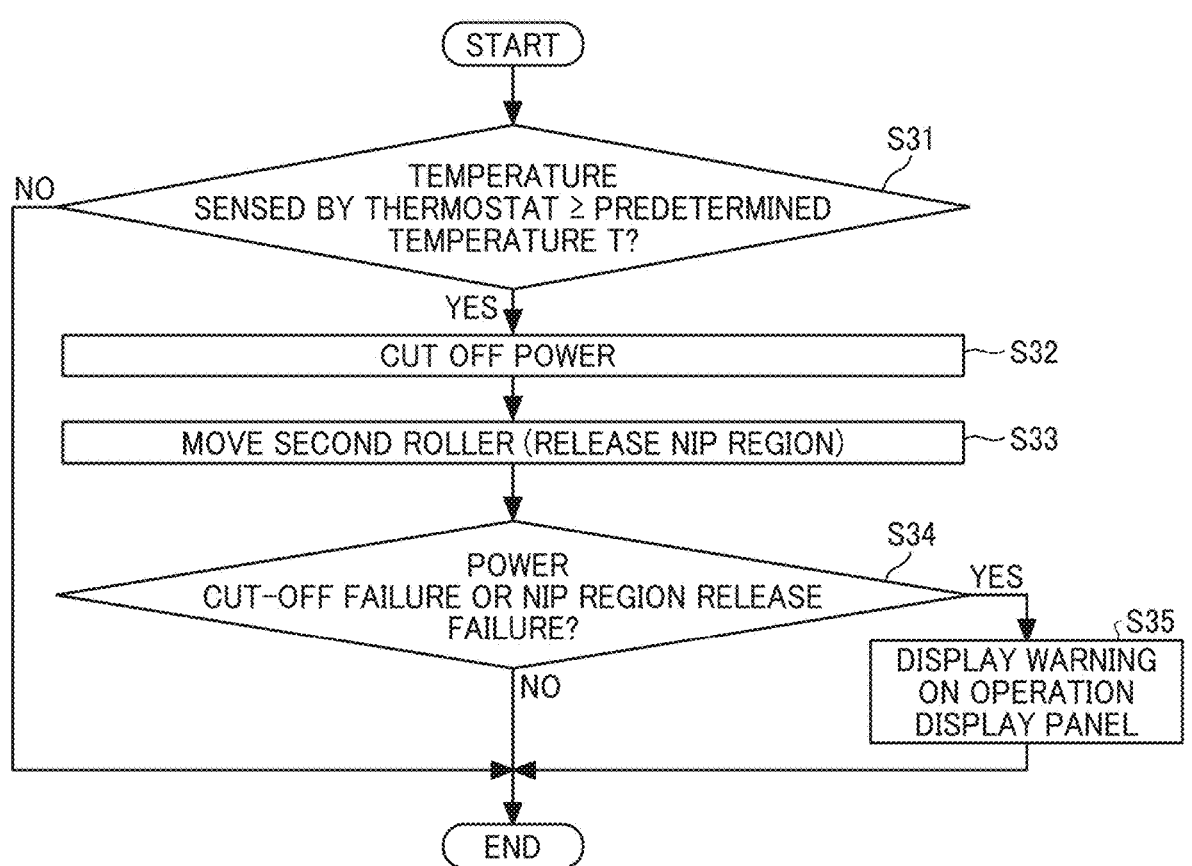
FIG. 17 is a flowchart of contact and separation control of the thermal pressure roller pair in the sheet lamination unit.

A description is given of a contact-separation control of the thermal pressure roller pair 51$a$ in the above-described sheet lamination device 51, with reference to FIG. 17.

First, when the thermostat 51$g$ detects that the roller surface temperature of the first roller 51$a1$ has reached the given temperature T, the thermostat 51$g$ cuts off the power supplied in the power line 51$x$ (steps S30 and S31). At the same time, the solenoid 51$e$ (movement mechanism 511) causes the second roller 51$a2$ to separate from the first roller 51$a1$ (step S32).

Then, the controller 90 determined whether the power detector 52 detects that a failure in power cutoff occurs or whether the photosensor 51$h$ detects that the separation failure (nip release failure) of the thermal pressure roller pair 51$a$ (step S33). When the power detector 52 or the photosensor 51$h$ detects such a failure (YES in step S33), the controller 90 causes the operation display panel 49 to display a warning on the screen (step S34). When the power detector 52 or the photosensor 51$h$ does not detect such a failure (NO in step S33), the flow is terminated without any further processing.

Modification 1

As illustrated in FIGS. 19 to 22, the sheet laminator 50 (sheet lamination device 51) according to Modification 1 includes a first solenoid 51$e1$ functioning as a first movement mechanism and a second solenoid 51$e2$ functioning as a second movement mechanism. Each of the first solenoid 51$e1$ and the second solenoid 51$e2$ functions as a movement mechanism.

Figure 20A:
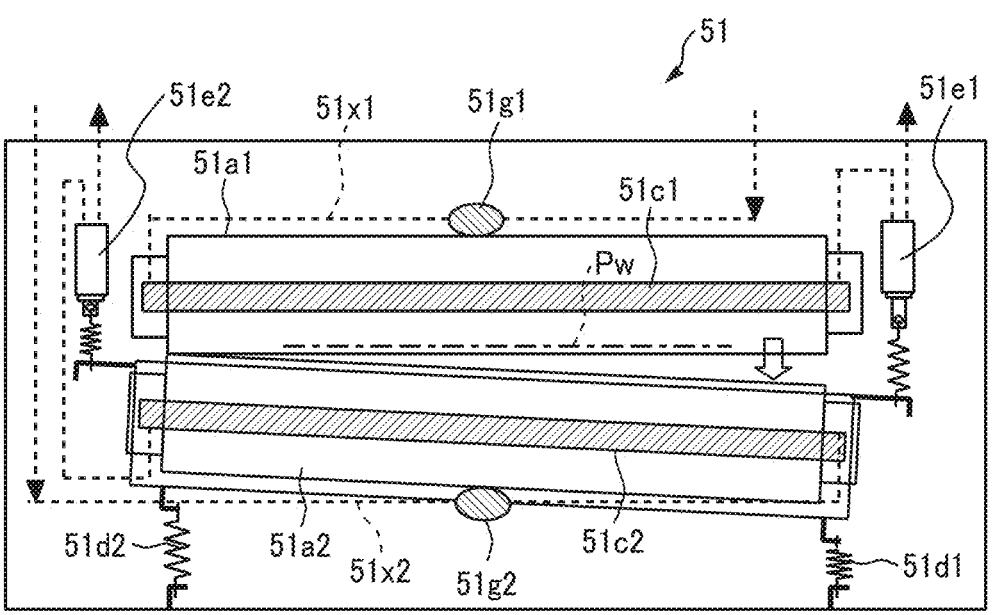
FIGS. 20A and 20B are diagrams, each illustrating a separation operation of the thermal pressure roller pair in the sheet lamination unit of FIG. 19.

As illustrated in FIG. 20A, the first solenoid 51$e1$ functioning as a first movement mechanism moves the other end of the second roller 51$a2$ in the width direction in a direction away from the first roller 51$a1$ around the one end of the second roller 51$a2$ in the width direction, without moving the first roller 51$a1$. In other words, the first solenoid 51$e1$ (first movement mechanism) has the configuration similar to the solenoid 51$e$ (movement mechanism 511) described above with reference to FIGS. 15A and 15B.

Figure 20B:
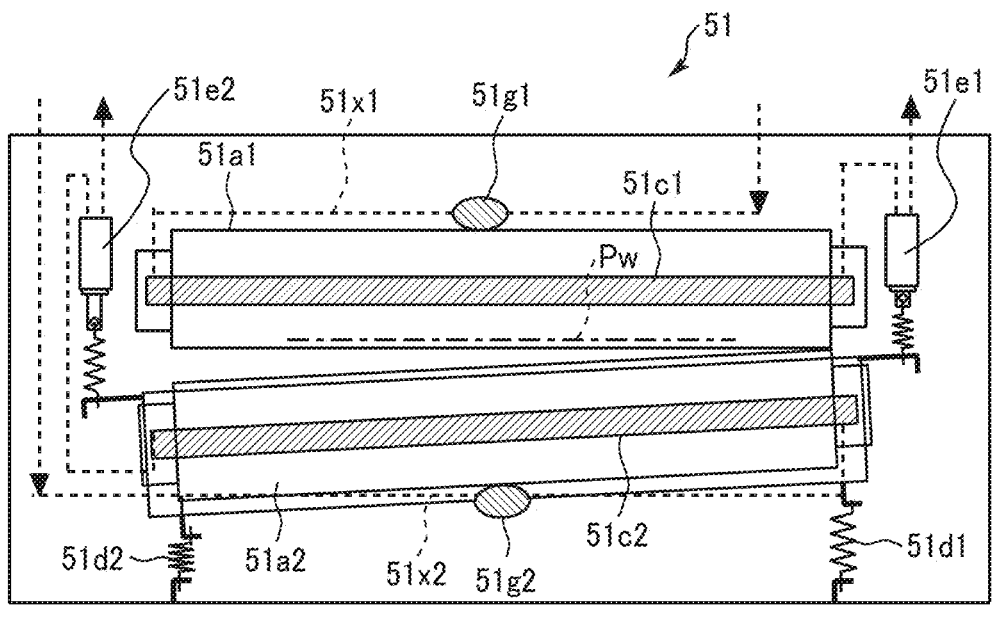

On the other hand, as illustrated in FIG. 20B, the second solenoid 51$e2$ functioning as the second movement mechanism moves the one end of the second roller 51$a2$ in the width direction in a direction away from the first roller 51$a1$ around the other end of the second solenoid 51$e2$ in the width direction, without moving the first roller 51$a1$. Specifically, the second movement mechanism is arranged on the one end in the width direction (left end in FIG. 19), and the first movement mechanism is arranged on the other end in the width direction (right end in FIG. 19).

In the present Modification 1, the power cutoff device includes a first thermostat 51$g1$ that senses a change in temperature of the roller surface of the first roller 51$a1$ and a second thermostat 51$g2$ that senses a change in temperature of the roller surface of the second roller 51$a2$.

Figure 21:
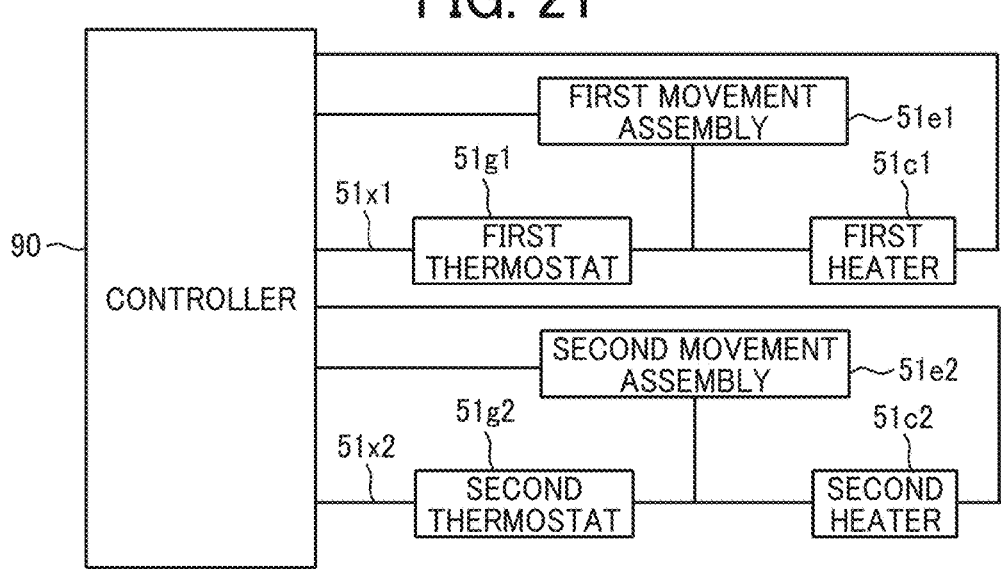
FIG. 21 is a block diagram illustrating a configuration of the current cutoff circuit in the sheet lamination unit of FIG. 19.

Further, as illustrated in the drawings such as FIGS. 19 and 21, the power line includes a first power line 51$x1$ to which the first thermostat 51$g1$ and the first solenoid 51$e1$ (first movement mechanism) are coupled, and a second power line 51$x2$ to which the second thermostat 51$g2$ and the second solenoid 51$e2$ (second movement mechanism) are coupled.

Figure 22:
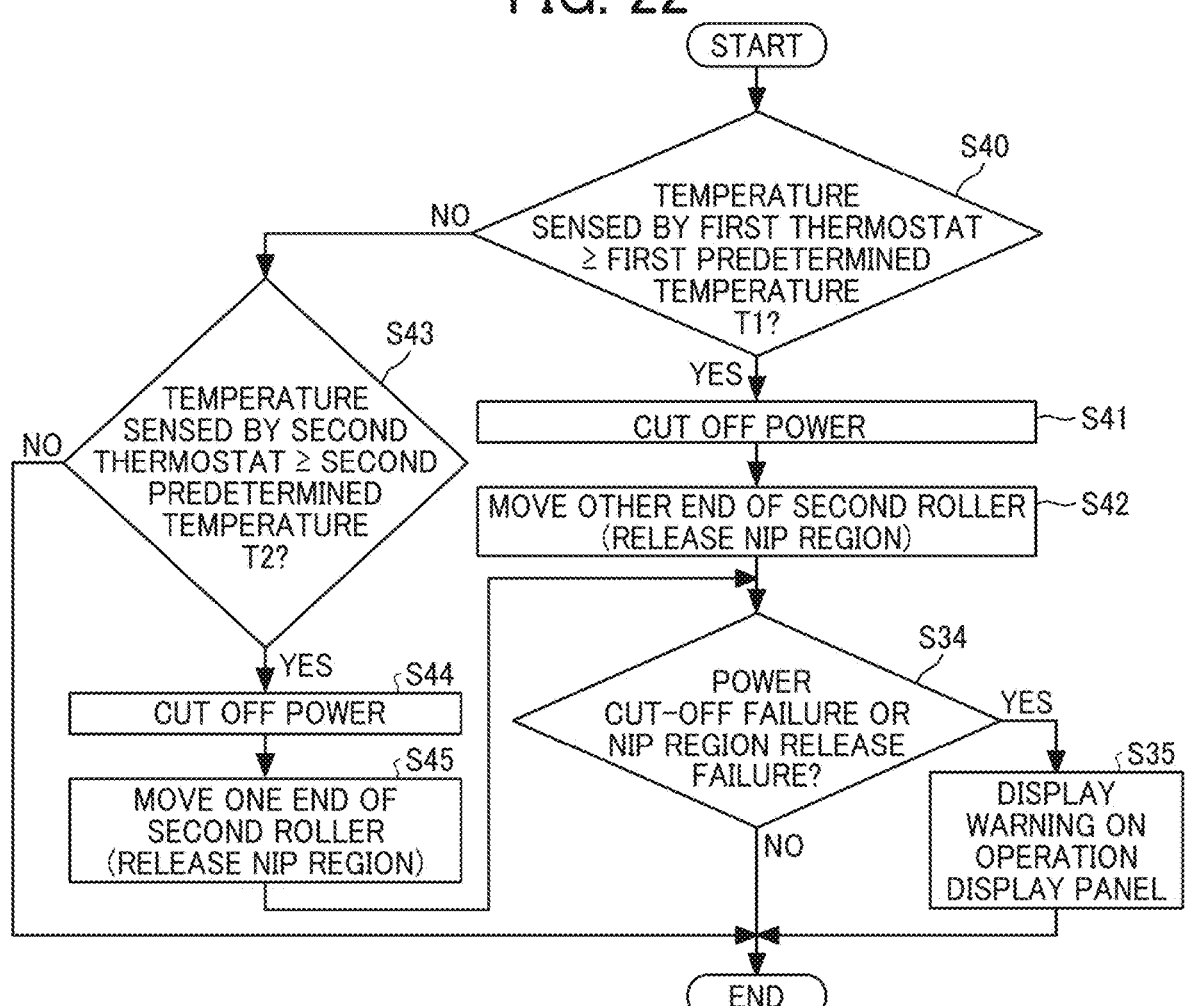
FIG. 22 is a flowchart of the contact and separation control of the thermal pressure roller pair in the sheet lamination unit of FIG. 19.

As illustrated in FIG. 22, when the roller surface of the first roller 51$a1$ reaches the first given temperature T1, the power supplied to the first heater 51$c1$ (first heater) and the first solenoid 51$e1$ (first movement mechanism) is cut off, and when the roller surface of the second roller 51$a2$ reaches the second given temperature T2, the energization to the second heater 51$c2$ (second heater) and the second solenoid 51$e2$ (second movement mechanism) is cut off.

More specifically, as illustrated in FIG. 22, when the first thermostat 51$g1$ senses that the roller surface temperature of the first roller 51$a1$ has reached the first given temperature T1, the first thermostat 51$g1$ cuts off the power in the first power line 51$x1$ (steps S40 and S41). At the same time, the first solenoid 51e1 (first movement mechanism) separates the other end of the second roller 51a2 (step S42).

On the other hand, in a case where the roller surface temperature of the first roller 51a1 has not reached the first given temperature T1 in step S40 (NO in step S40), when the second thermostat 51g2 senses that the roller surface temperature of the second roller 51a2 has reached the second given temperature T2, the second thermostat 51g2 cuts off the power in the second power line 51x2 (steps S43 and S44). At the same time, the second solenoid 51e2 (second movement mechanism) separates the one end of the second roller 51a2 (step S45).

Then, after the controller 90 causes the second roller 51a2 to separate from the first roller 51a1 in step S42 or step S45, the flow from step S33 is performed.

In the configuration of Modification 1, in a case where the controller 90 controls as described above, the abnormal condition in the sheet laminating operation (sheet lamination) also less likely occurs even when the overtemperature (excessive temperature rise) occurs in the thermal pressure roller pair 51a. In particular, in a case, for example, where the temperature at which the first roller 51a1 undergoes thermal deterioration (first given temperature T1) is different from the temperature at which the second roller 51a2 undergoes thermal deterioration (second given temperature T2), the configuration and control according to the present Modification 1 are useful.

Modification 2

Figure 23:
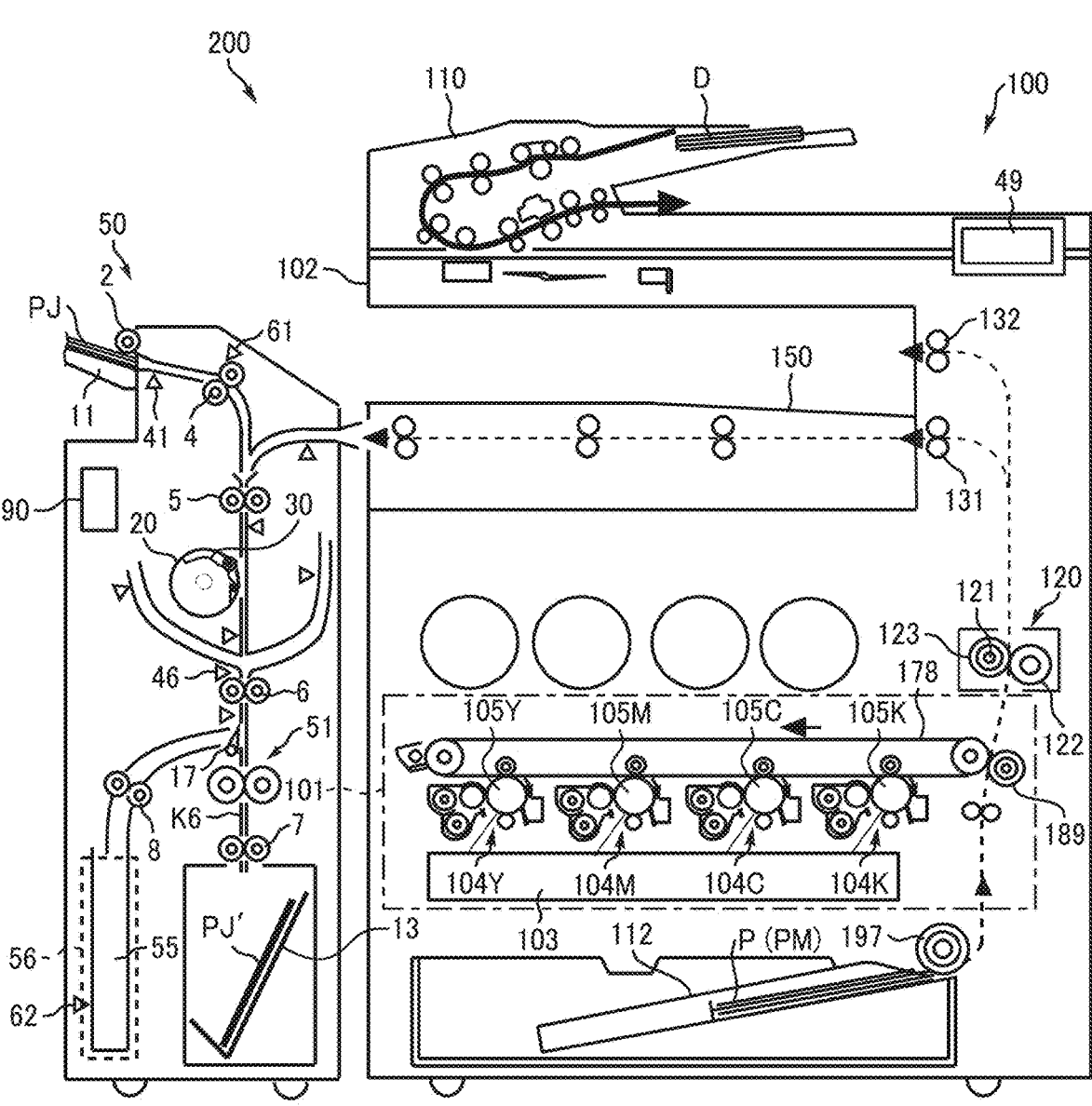
FIG. 23 is a diagram illustrating an image forming system according to Modification 2.

A description is given of an image forming system according to Modification 2, with reference to FIG. 23.

FIG. 23 is a diagram illustrating an image forming system according to Modification 2 of an embodiment of the present disclosure.

As illustrated in FIG. 23, an image forming system 200 according to Modification 2 includes an image forming apparatus 100 that forms an image on a sheet P and the sheet laminator 50 illustrated in FIG. 1, disposed on the image forming apparatus 100.

However, in the image forming system 200, the sheet P that is fed from a sheet feeding device 112 disposed in the image forming apparatus 100 and conveyed by a sheet feed roller 197 disposed in the image forming apparatus 100 is conveyed as the inner sheet PM to the sheet laminator 50.

With reference to FIG. 23, in the image forming apparatus 100, multiple pairs of sheet conveying rollers disposed in a document feeder 110 feed an original document D from a document loading table and convey the original document D in a direction indicated by arrow in FIG. 23. By so doing, the original document D passes over a document reading device 102. At this time, the document reading device 102 optically reads image data of the original document D while the original document D is passing over the document reading device 102.

The image data optically scanned by the document reading device 102 is converted into electrical signals. The electrical signals are then transmitted to a writing device 103 of the image forming device 101. The writing device 103 emits laser beams onto photoconductor drums 105Y, 105M, 105C, and 105K, based on the electrical signals of the image data in each of colors, respectively, in the exposing process.

In the image forming apparatus 100, a charging process, the exposing process, and a developing process are sequentially executed on the photoconductor drums 105Y, 105M, 105C, and 105K of respective image forming units 104Y, 104M, 104C, and 104K to form desired images on the photoconductor drums 105Y, 105M, 105C, and 105K, respectively.

The images formed on the photoconductor drums 105Y, 105M, 105C, and 105K are transferred and superimposed onto the intermediate transfer belt 178 to form a color image. The color image formed on the intermediate transfer belt 178 is further transferred onto the surface of a sheet P (which is to be the inner sheet PM) fed and conveyed from the sheet feeding device 112 by the sheet feed roller 197 at a position at which the intermediate transfer belt 178 faces a secondary transfer roller 189.

After the color image is transferred onto the surface of the sheet P (that is, the inner sheet PM), the sheet P is conveyed to the position of a fixing device 120. The fixing device 120 fixes the transferred color image on the surface of the sheet P, to the sheet P by performing the fixing operation in the fixing process. The fixing device 120 includes a fixing roller 121 and a pressure roller 122. The fixing roller 121 includes a fixing heater 123 functioning as a heater. The pressure roller 122 contacts the fixing roller 121 with pressure to form a fixing nip region to which the sheet P is conveyed.

The sheet P is then ejected from the image forming apparatus 100 by an ejection roller pair 131, and is fed as the inner sheet PM into the sheet laminator 50 via a relay device 150. At this time, when the sheet laminator 50 receives the inner sheet PM, the sheet laminator 50 has completed the operation described with reference to FIGS. 5A to 8C, in other words, the sheet separating operation to separate the two-ply sheet PJ, and performs the operation described with reference to FIGS. 9A to 9C, in other words, the sheet inserting operation to insert the inner sheet PM into the two-ply sheet PJ, after the sheet laminator 50 receives the inner sheet PM. Further, after the sheet lamination unit 51 has completed the sheet laminating operation on the two-ply sheet PJ in which the inner sheet PM is inserted, the ejection roller pair 7 ejects the two-ply sheet PJ to stack the two-ply sheet PJ on the ejection tray 13.

As described above, a series of image forming processes (i.e., the printing operations) in the image forming apparatus 100 and a series of sheet separating operation and the sheet laminating operation on the inner sheet PM on which the image in the sheet laminator 50 is formed are completed.

When the above-described sheet laminating operation is not performed, the image forming apparatus 100 according to Modification 2 ejects the sheet P having the image formed in the image forming operations, from a second ejection roller pair 132 to the outside of the image forming apparatus 100, so as to stack the sheet P on the top face of the relay device 150 (ejection tray).

In the image forming system 200 having the above-described configuration, when the thermostat 51g cuts off the power to at least one of the first heater 51c1 (first heater) or the second heater 51c2 (second heater), the movement mechanism 511 (51e, 51f, and 51d) moves the second roller 51a2 relative to the first roller 51a1. As a result, even when the overtemperature occurs in the thermal pressure roller pair 51a, the abnormal condition in the sheet laminating operation less likely occurs.

The image forming apparatus 100 according to Modification 2 of the present disclosure is a color image forming apparatus but may be a monochrome image forming apparatus. The image forming apparatus 100 according to Modification 2 of the present disclosure employs electrophotography, but the present disclosure is not limited to an electrophotographic image forming apparatus. For example, the present disclosure may be applied to other types of image forming apparatuses such as an inkjet image forming apparatus and a stencil printing machine.

Modification 3

Figure 24A:
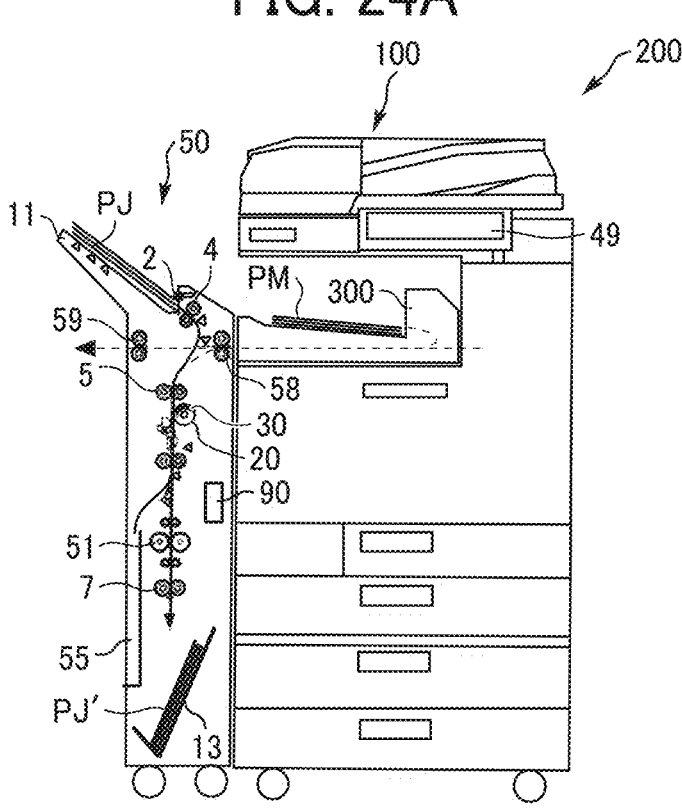
FIGS. 24A and 24B are diagrams, each illustrating an image forming system according to Modification 3.
Figure 24B:
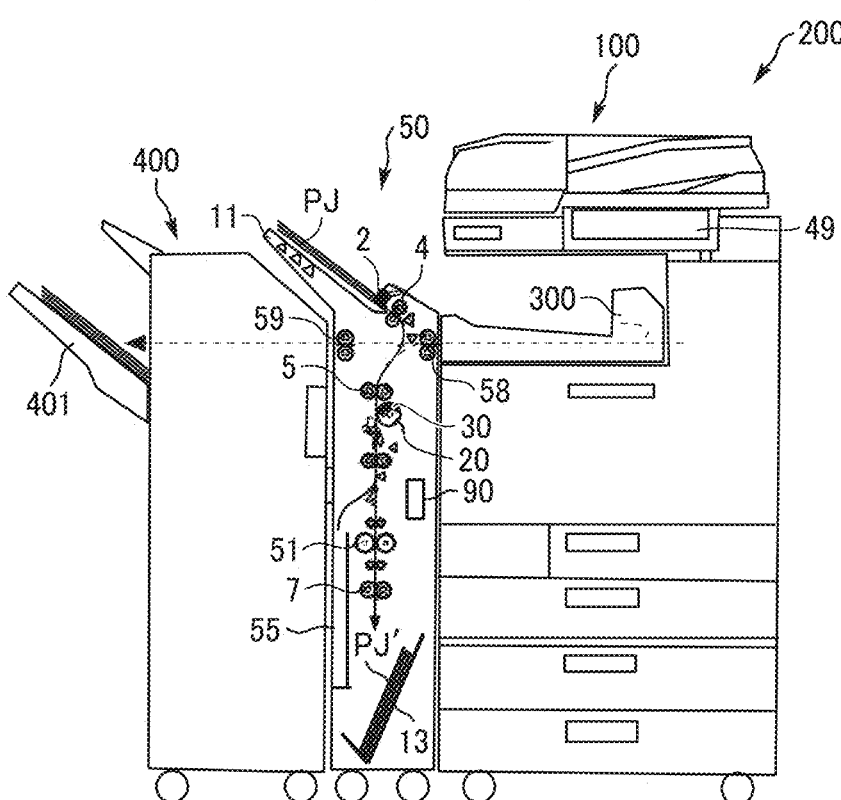

A description is given of an image forming system according to Modification 3 of the present embodiment, with reference to FIGS. 24A and 24B.

As illustrated in FIGS. 24A and 24B, an image forming system 200 according to Modification 3 includes the image forming apparatus 100 and the sheet laminator 50 that includes the sheet lamination device 51 and the sheet separation device 1. The sheet laminator 50 is detachably attached to the image forming apparatus 100. As in the image forming apparatus 100 according to Modification 2, the sheet P that is fed from the sheet feeding device 112 and conveyed by the sheet feed roller 197 in the image forming apparatus 100 is conveyed as the inner sheet PM to the sheet laminator 50 attached to the image forming apparatus 100 of Modification 3.

In the image forming system 200 illustrated in FIG. 24A, the image forming apparatus 100 performs the image forming operations on the sheet P, as described above with reference to FIG. 23. Then, the ejection roller pair 131 of the image forming apparatus 100 ejects the sheet P (that is, the inner sheet PM on which a desired image is formed) from the image forming apparatus 100 to the sheet laminator 50 via the relay device 300. Then, after the sheet P is conveyed to the sheet laminator 50, the sheet P is inserted into the two-ply sheet PJ, where the sheet laminator 50 performs the sheet laminating operation on the two-ply sheet PJ. Then, the ejection roller pair 7 ejects the two-ply sheet PJ to the ejection tray 13.

In the image forming system 200 having the above-described configuration, when the thermostat 51g cuts off the power to at least one of the first heater 51c1 (first heater) or the second heater 51c2 (second heater), the movement mechanism 511 (51e, 51f, and 51d) moves the second roller 51a2 relative to the first roller 51a1. As a result, even when the overtemperature occurs in the thermal pressure roller pair 51a, the abnormal condition in the sheet laminating operation less likely occurs.

As described above, the sheet laminator 50 is detachably attached to the image forming apparatus 100. When the sheet laminator 50 is not used, the sheet laminator 50 may be detached from the image forming apparatus 100. When the sheet laminator 50 is detached from the image forming apparatus 100, an ejection tray is provided at the portion to which the sheet laminator 50 is connected. By so doing, when the sheet P having the desired image is ejected by the ejection roller pair 131 to the outside of the image forming apparatus 100, the sheet P is stacked on the ejection tray.

In addition to the sheet conveyance passage for guiding the inner sheet PM ejected from the image forming apparatus 100 to the sheet separation device 1 (winding roller 20), the sheet laminator 50 may be provided with another sheet conveyance passage (defined by sheet conveying roller pairs 58 and 59), as illustrated in FIG. 24A, for ejecting the sheet P ejected from the image forming apparatus 100 without performing the sheet laminating operation on the sheet P.

The image forming system 200 may also be provided with a relay device 300 that guides the sheet P (including the inner sheet PM) ejected from the image forming apparatus 100 to the sheet laminator 50. (skip) In this case, the inner sheet PM may be fed from the relay device 300.

Further, FIG. 24B is a schematic view of the image forming system 200 according to yet another embodiment of the present disclosure.

As the image forming system 200 illustrated in FIG. 24B, a post-processing apparatus 400 may be provided to perform the post-processing operations including the punching operation and the stapling operation, on the sheet P ejected from the image forming apparatus 100 through the sheet laminator 50 (in other words, on the sheet P without the sheet laminating operation). In such a case, the sheet P is ejected to an ejection tray 401 of the post-processing apparatus 400 after the post-processing operation has been performed on the sheet P.

As described above, the sheet laminator 50 according to the present embodiment is a sheet lamination device to perform sheet lamination (sheet laminating operation) on the two-ply sheet PJ in which an inner sheet PM is inserted between the two sheets, which are the first sheet P1 and the second sheet P2 and includes the thermal pressure roller pair 51a having two rollers that forms a nip region in which a two-ply sheet PJ is conveyed while being pressed in contact with the first roller 51a1 that is heated by the first heater 51c1 (first heater) and the second roller 51a2 that is heated by the second heater 51c2 (second heater). The sheet laminator 50 further includes the thermostat 51g (power cutoff device) that can detect a change in temperature of at least one of the first roller 51a1 or the second roller 51a2 and cut off the power to at least one of the first heater 51c1 or the second heater 51c2. In addition, the sheet laminator 50 includes the movement mechanism 511 (51e, 51f, and 51d) that moves the second roller 51a2 relative to the first roller 51a1 so as to release the nip region corresponding to the conveyance area Pw in the width direction of the two-ply sheet PJ. Further, the sheet laminator 50 includes the power line 51x to which the thermostat 51g and the movement mechanism 511 (51e, 51f, and 51d) are coupled. When the thermostat 51g cuts off the power supplied to the first heater 51c1, the second heater 51c2, or both, the power supplied to the movement mechanism 511 (51e, 51f, and 51d) via the power line 51x is also cut off, and the movement mechanism 511 (51e, 51f, and 51d) moves the second roller 51a2 relative to the first roller 51a1.

As a result, even when the overtemperature occurs in the thermal pressure roller pair 51a, the abnormal condition in the sheet laminating operation less likely occurs.

The sheet separation device 1 according to the present embodiment includes the movement mechanism 511 in which the first roller 51a1 is fixed and the second roller 51a2 is moved. However, the movement mechanism 511 may have a configuration in which the second roller 51a2 is fixed and the first roller 51a1 is moved.

Even in such a configuration, the same effect as the configuration according to the present embodiment can be achieved.

The present disclosure is not limited to the above-described embodiment and variations, and the configuration of the present embodiment can be appropriately modified other than suggested in the above embodiment and variations within a scope of the technological concept of the present disclosure. For example, the number, position, shape, and so on of the above-described components are not limited to the number, position, shape, and so on of the above-described embodiment unless in particular specified but may be, for example, any suitable number, position, and shape.

Note that, in the present disclosure, the "end face" of the two-ply sheet is defined as an end (side face) of the two-ply sheet extending in the thickness direction and connecting the front face and the back face of the two-ply sheet. Accordingly, there are four end faces of the rectangular two-ply sheet on the front, back, left, and right.

Aspects of the present disclosure are, for example, as follows.

Aspect 1

In Aspect 1, a sheet laminator (for example, the sheet laminator 50) includes a thermal pressure roller pair (for example, the thermal pressure roller pair 51*a*), a power cutoff device (for example, the thermostat 51*g*), a mover (for example, the movement mechanism 511, the solenoid 51*e*, the first tension spring 51*f*, the second tension spring 51*d*), a power line (for example, the power line 51*x*), and circuitry (for example, the controller 90). The thermal pressure roller pair includes a first roller (for example, the first roller 51*a*1), a first heater (for example, the first heater 51*c*1) to heat the first roller, a second roller (for example, the second roller 51*a*2), and a second heater (for example, the second heater 51*c*2) to heat the second roller. The thermal pressure roller pair forms a nip region to which a two-ply sheet pressed and conveyed by the first roller and the second roller, where the two-ply sheet has two sheets between which an inner sheet is inserted. The power cutoff device detects a change in temperature of at least one of the first roller or the second roller, and cut off a power to at least one of the first heater or the second heater. The mover moves the second roller relative to the first roller to release the nip region corresponding to a conveyance area in a width direction of the two-ply sheet. The power line couples the power cutoff device and the mover. The circuitry is to cut off a power to the mover via the power line, and cause the mover to move the second roller relative to the first roller, when the power to the at least one of the first heater or the second heater is cut off by the power cutoff device.

Aspect 2

In Aspect 2, in the sheet laminator according to Aspect 1, the circuitry is to cause the mover to move a first end of the second roller about a second end of the second roller in the width direction in a direction away from the first roller without moving the first roller.

Aspect 3

In Aspect 3, in the sheet laminator according to Aspect 2, the power cutoff device includes a thermostat (for example, the thermostat 51*g*) to detect a change in temperature of a roller surface of the first roller. The thermostat cuts off the power to the first heater, the second heater, and the mover when a roller surface of the first roller reaches a given temperature.

Aspect 4

In Aspect 4, in the sheet laminator according to Aspect 1, the mover includes a first movement mechanism (for example, the first solenoid 51*e*1) and a second movement mechanism (for example, the second solenoid 51*e*2). The first movement mechanism moves a first end of the second roller in the width direction in a direction away from the first roller about a second end of the second roller in the width direction, without moving the first roller. The second movement mechanism moves the first end of the second roller in the width direction in a direction away from the first roller around the second end of the second roller in the width direction, without moving the first roller.

Aspect 5

In Aspect 5, in the sheet laminator according to Aspect 1, the power cutoff device includes a first thermostat (for example, the first thermostat 51*g*1) and a second thermostat (for example, the second thermostat 51*g*2). The first thermostat detects a change in temperature of a roller surface of the first roller. The second thermostat detects a change in temperature of a roller surface of the second roller. The mover includes a first movement mechanism (for example, the first solenoid 51*e*1) and a second movement mechanism (for example, the second solenoid 51*e*2). The first movement mechanism moves a first end of the second roller in the width direction in a direction away from the first roller about a second end of the second roller in the width direction, without moving the first roller. The second movement mechanism moves the first end of the second roller in the width direction in a direction away from the first roller around the second end of the second roller in the width direction, without moving the first roller. The power line includes a first power line (for example, the first power line 51*x*1) and a second power line (for example, the second power line 51*x*2). The first power line is a power line to which the first thermostat and the first movement mechanism are coupled. The second power line is a power line to which the second thermostat and the second movement mechanism are coupled. The circuitry is to cut off the power supplied to the first heater and the first movement mechanism when the roller surface of the first roller reaches a first given temperature (for example, the first given temperature T1), and cut off the power supplied to the second heater and the second movement mechanism when the roller surface of the second roller reaches a second given temperature (for example, the second given temperature T2).

Aspect 6

In Aspect 6, the sheet laminator according to any one of Aspects 1 to 5 includes a movement detector (for example, the photosensor 51*h*) and a power detector (for example, the power detector 52). The movement detector detects whether a relative movement of the second roller is made by the mover. The power detector detects a cutoff of the power by the power cutoff device. The circuitry is to notify a user of a detection result by the power cutoff device and the mover when the cutoff of the power by the power cutoff device and the relative movement of the second roller by the mover are to be performed and the power cutoff device and the mover detect that none or one of the cutoff of the power and the relative movement of the second roller is performed.

Aspect 7

In Aspect 7, in the sheet laminator according to any one of Aspects 1 to 6, the mover includes a solenoid (for example, the solenoid 51*e*) to move the second roller to contact the first roller when the power is supplied, and move the second roller to separate from the first roller when the power is cut off.

Aspect 8

In Aspect 8, the sheet laminator according to any one of Aspects 1 to 7 further includes a sheet separation device (for example, the sheet separation device 1) and a sheet lamination device (for example, the sheet lamination device 51). The sheet separation device separates a non-bonding portion of the two-ply sheet in which the two sheets are overlaid and bonded at a bonding portion. The sheet lamination device includes the thermal pressure roller pair.

Aspect 9

In Aspect 9, an image forming system (for example, the image forming system 200) includes an image forming apparatus (for example, the image forming apparatus 100) to form an image on an inner sheet, and the sheet laminator (for example, the sheet laminator 50) according to any one of Aspects 1 to 8.

Aspect 10

In Aspect 10, a sheet laminator (for example, the sheet laminator 50) includes a thermal pressure roller pair (for example, the thermal pressure roller pair 51*a*), a power cutoff device (for example, the thermostat 51*g*), a mover (for example, the movement mechanism 511, the solenoid 51*e*, the first tension spring 51*f*, the second tension spring 51*d*), a power line (for example, the power line 51*x*), and circuitry (for example, the controller 90). The thermal pressure roller pair includes a first roller (for example, the first roller 51*a*1), a first heater (for example, the first heater 51*c*1) to heat the first roller, a second roller (for example, the second roller 51*a*2), and a second heater (for example, the second heater 51*c*2) to heat the second roller, to form a nip region between the first roller and the second roller to press and convey a two-ply sheet in which an inner sheet is inserted between two sheets of the two-ply sheet. The power cutoff device detects a change in temperature of at least one of the first roller or the second roller, and cuts off a power to at least one of the first heater or the second heater. The mover relatively moves the second roller away from the first roller. The power line couples the power cutoff device to the mover. The circuitry is to cause the power cutoff device to cut off the power line, and cause the mover to relatively move the second roller away from the first roller, in response to the power cutoff device cutting off the power to at least one of the first heater or the second heater.

Aspect 11

In Aspect 11, in the sheet laminator according to Aspect 10, the second roller has a first end and a second end opposite to the first end in an axial direction of the second roller. The circuitry is to cause the mover to move the first end of the second roller away from the first roller about the second end of the second roller while the position of the first roller is fixed.

Aspect 12

In Aspect 12, in the sheet laminator according to Aspect 11, the power cutoff device includes a thermostat (for example, the thermostat 51*g*) detectable the change in temperature of a roller surface of the first roller. The thermostat cuts off the power to the first heater, the second heater, and the mover, when a temperature of the roller surface of the first roller reaches a given temperature.

Aspect 13

In Aspect 13, in the sheet laminator according to Aspect 10, the second roller has a first end and a second end opposite to the first end in an axial direction of the second roller. The mover includes a first mover (for example, the first solenoid 51*e*1) and a second mover (for example, the second solenoid 51*e*2). The first mover moves the first end of the second roller away from the first roller about the second end of the second roller while the position of the first roller is fixed. The second mover moves the second end of the second roller away from the first roller about the first end of the second roller while the position of the first roller is fixed.

Aspect 14

In Aspect 14, in the sheet laminator according to Aspect 10, the second roller has a first end and a second end opposite to the first end in an axial direction of the second roller. The power cutoff device includes a first thermostat (for example, the first thermostat 51*g*1) and a second thermostat (for example, the second thermostat 51*g*2). The first thermostat detects the change in temperature of a first surface of the first roller. The second thermostat detects the change in temperature of a second surface of the second roller. The mover includes a first mover (for example, the first solenoid 51*e*1) and a second mover (for example, the second solenoid 51*e*2). The first mover moves the second end of the second roller away from the first roller about the first end of the second roller while the position of the first roller is fixed. The second mover moves the first end of the second roller away from the first roller about the second end of the second roller while the position of the first roller is fixed. The power line includes a first power line (for example, the first power line 51*x*1) and a second power line (for example, the second power line 51*x*2). The first power line couples the first thermostat and the first mover. The second power line couples the second thermostat and the second mover. The circuitry is to cut off the first power line when a temperature of the first surface of the first roller reaches a first given temperature (for example, the first given temperature T1), and cut off the second power line when the second surface of the second roller reaches a second given temperature (for example, the second given temperature T2).

Aspect 15

In Aspect 15, the sheet laminator according to any one of Aspects 10 to 14 further includes a movement detector (for example, the photosensor 51*h*) and a power detector (for example, the power detector 52). The movement detector detects whether a relative movement of the second roller is made by the mover. The power detector detects a cutoff of the power by the power cutoff device. The circuitry is to notify a user of a detection result by the power cutoff device and the mover when the cutoff of the power by the power cutoff device and the relative movement of the second roller by the mover are to be performed and the power cutoff device and the mover detect that none or one of the cutoff of the power and the relative movement of the second roller is performed.

Aspect 16

In Aspect 16, in the sheet laminator according to any one of Aspects 10 to 15, the mover includes a solenoid (for example, the solenoid 51*e*) to move the second roller to contact the first roller when the power is supplied, and move the second roller to separate from the first roller when the power is cut off.

Aspect 17

In Aspect 17, the sheet laminator according to any one of Aspects 10 to 16 further includes a sheet separation device (for example, the sheet separation device 1) and a sheet lamination device (for example, the sheet lamination device 51). The sheet separation device separates a non-bonding portion of the two-ply sheet in which the two sheets are overlaid and bonded at a bonding portion. The sheet lamination device includes the thermal pressure roller pair.

Aspect 18

In Aspect 18, the sheet laminator (for example, the sheet laminator 50) according to any one of Aspects 10 to 17, and an image forming apparatus (for example, the image forming apparatus 100) to form an image on an inner sheet to be conveyed to the sheet laminator.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A sheet laminator comprising:
a thermal pressure roller pair including:
   a first roller;
   a first heater to heat the first roller;
   a second roller; and
   a second heater to heat the second roller,
   to form a nip region between the first roller and the second roller to press and convey a two-ply sheet in which an inner sheet is inserted between two sheets of the two-ply sheet;
a power cutoff device to:
   detect a change in temperature of at least one of the first roller or the second roller; and
   cut off a power to at least one of the first heater or the second heater;
a mover to relatively move the second roller away from the first roller;
a power line coupling the power cutoff device to the mover; and
circuitry configured to:
cause the power cutoff device to cut off the power line; and
cause the mover to relatively move the second roller away from the first roller,
in response to the power cutoff device cutting off the power to at least one of the first heater or the second heater.

2. The sheet laminator according to claim 1,
wherein the second roller has a first end and a second end opposite to the first end in an axial direction of the second roller, and
the circuitry is configured to:
cause the mover to move the first end of the second roller away from the first roller about the second end of the second roller while the position of the first roller is fixed.

3. The sheet laminator according to claim 2,
wherein the power cutoff device includes a thermostat detectable the change in temperature of a roller surface of the first roller, and
the thermostat cuts off the power to the first heater, the second heater, and the mover,
when a temperature of the roller surface of the first roller reaches a given temperature.

4. The sheet laminator according to claim 1,
wherein the second roller has a first end and a second end opposite to the first end in an axial direction of the second roller, and the mover includes:
a first mover to move the first end of the second roller away from the first roller about the second end of the second roller while the position of the first roller is fixed; and
a second mover to move the second end of the second roller away from the first roller about the first end of the second roller while the position of the first roller is fixed.

5. The sheet laminator according to claim 1,
wherein the second roller has a first end and a second end opposite to the first end in an axial direction of the second roller, and
the power cutoff device includes:
a first thermostat to detect the change in temperature of a first surface of the first roller; and
a second thermostat to detect the change in temperature of a second surface of the second roller,
the mover includes:
a first mover to move the second end of the second roller away from the first roller about the first end of the second roller while the position of the first roller is fixed; and
a second mover to move the first end of the second roller away from the first roller about the second end of the second roller while the position of the first roller is fixed;
the power line includes:
a first power line coupling the first thermostat and the first mover; and
a second power line coupling the second thermostat and the second mover,
wherein the circuitry is configured to:
cut off the first power line when a temperature of the first surface of the first roller reaches a first given temperature; and
cut off the second power line when the second surface of the second roller reaches a second given temperature.

6. The sheet laminator according to claim 1, further comprising:
a movement detector to detect whether a relative movement of the second roller is made by the mover; and
a power detector to detect a cutoff of the power by the power cutoff device,
wherein the circuitry is configured to notify a user of a detection result by the power cutoff device and the mover, when the cutoff of the power by the power cutoff device and the relative movement of the second roller by the mover are to be performed and the power cutoff device and the mover detect that none or one of the cutoff of the power and the relative movement of the second roller is performed.

7. The sheet laminator according to claim 1,
wherein the mover includes a solenoid to:
move the second roller to contact the first roller when the power is supplied; and
move the second roller to separate from the first roller when the power is cut off.

8. The sheet laminator according to claim 1, further comprising:
a sheet separation device to separate a non-bonding portion of the two-ply sheet in which the two sheets are overlaid and bonded at a bonding portion; and
a sheet lamination device including the thermal pressure roller pair.

9. An image forming system comprising:

the sheet laminator according to claim 1; and an image forming apparatus to form an image on the inner
  sheet to be conveyed to the sheet laminator.

* * * * *